(12) United States Patent
Tsadka et al.

(10) Patent No.: US 8,701,482 B2
(45) Date of Patent: Apr. 22, 2014

(54) METHODS, DEVICES AND SYSTEMS FOR REMOTE WIND SENSING A LASER ANEMOMETER

(75) Inventors: Sagie Tsadka, D.N. Emek Soreq (IL); Nathan Sela, Modi'in (IL)

(73) Assignee: Pentalum Technologies, Ltd., Rehovot (IL)

( * ) Notice: Subject to any disclaimer, the term of this patent is extended or adjusted under 35 U.S.C. 154(b) by 556 days.

(21) Appl. No.: 12/892,551

(22) Filed: Sep. 28, 2010

(65) Prior Publication Data

US 2011/0106324 A1    May 5, 2011

Related U.S. Application Data

(60) Provisional application No. 61/246,174, filed on Sep. 28, 2009, provisional application No. 61/285,991, filed on Dec. 13, 2009, provisional application No. 61/351,976, filed on Jun. 7, 2010, provisional application No. 61/352,396, filed on Jun. 8, 2010.

(51) Int. Cl.
*G01P 13/00*    (2006.01)
*G01N 21/00*    (2006.01)

(52) U.S. Cl.
USPC ........................................ 73/170.01; 356/432

(58) Field of Classification Search
None
See application file for complete search history.

(56) References Cited

U.S. PATENT DOCUMENTS

| | | | |
|---|---|---|---|
| 2,946,893 A * | 7/1960 | Baum | 250/203.7 |
| 4,130,339 A * | 12/1978 | Kawamura et al. | 359/218.1 |
| 4,191,476 A * | 3/1980 | Pollard | 356/489 |
| 4,651,017 A | 3/1987 | Longrigg | |
| 5,796,471 A | 8/1998 | Wilkerson et al. | |
| 6,166,376 A * | 12/2000 | Kamioka | 250/235 |
| 6,313,908 B1 | 11/2001 | McGill et al. | |
| 6,320,272 B1 | 11/2001 | Lading et al. | |
| 6,646,725 B1 | 11/2003 | Eichinger et al. | |
| 6,687,036 B2 | 2/2004 | Riza | |
| 6,741,361 B2 * | 5/2004 | Marron | 356/512 |
| 6,870,629 B1 * | 3/2005 | Vogel et al. | 356/519 |
| 6,882,433 B2 * | 4/2005 | Marron et al. | 356/512 |
| 6,946,751 B2 | 9/2005 | Yoshida et al. | |
| 7,221,438 B2 | 5/2007 | Harris | |
| 7,281,891 B2 | 10/2007 | Smith et al. | |
| 7,311,000 B2 | 12/2007 | Smith et al. | |
| 7,342,323 B2 | 3/2008 | Avagliano et al. | |
| 7,391,506 B2 | 6/2008 | Harris et al. | |

(Continued)

FOREIGN PATENT DOCUMENTS

| | | |
|---|---|---|
| JP | 11-133049 | 5/1999 |
| JP | 11-271350 | 10/1999 |

OTHER PUBLICATIONS

Xia, et al., "Dual-beam incoherent cross-correlation spectroscopy", vol. 12, No. 7, Jul. 1995.

(Continued)

*Primary Examiner* — Lisa Caputo
*Assistant Examiner* — Jermaine Jenkins
(74) *Attorney, Agent, or Firm* — Sughrue Mion, PLLC

(57) ABSTRACT

A system for monitoring wind characteristics in a volume including a plurality of non-coherent laser anemometers operative to measure wind characteristics in a plurality of corresponding sub-volumes located within the volume and a data processing subsystem operative to receive data from the plurality of non-coherent laser anemometers and to provide output data representing the wind characteristics in the volume.

26 Claims, 18 Drawing Sheets

(56) References Cited

U.S. PATENT DOCUMENTS

| | | |
|---|---|---|
| 2003/0043364 A1 | 3/2003 | Jamieson |
| 2005/0002013 A1 | 1/2005 | Harris |
| 2006/0140764 A1 | 6/2006 | Smith et al. |
| 2007/0124025 A1 | 5/2007 | Schram et al. |
| 2007/0158493 A1 | 7/2007 | Shapira et al. |
| 2008/0180691 A1 | 7/2008 | Hays |
| 2008/0210881 A1 | 9/2008 | Harris et al. |
| 2009/0046289 A1 | 2/2009 | Caldwell et al. |
| 2009/0099702 A1 | 4/2009 | Vyas et al. |

OTHER PUBLICATIONS

Hannon, et al., :Large scale wind resource mapping using a state-of-the-art 3D scanning LIDAR, Paper (Online), Jun. 2008.

Jaynes, et al., MTC final progress report: LIDAR, MIT (Online), Jul. 19, 2007.

An International Search Report dated Feb. 11, 2001, which issued during the prosecution of Applicant's PCT/IB10/02434.

An Office Action with Search Report together with the English translation dated May 27, 2013 which issued during the prosecution of Chinese Patent Application No. 201080043382.6.

Mayor et al., Two-Dimensional Vector Wind Fields from Volume Imaging Lidar Data, *Journal of Applied Meteorology* 40:1331-1346 (2001).

Piironen et al, Accuracy Analysis of Wind Profiles Calculated from Volume Imaging Lidar Data, *Journal of Geophysical Research* 100:25559-25567, Sep, 21, 2012.

Vaughn et al, Laser Doppler Velocimetry Applied to the Measurement of Local and Global Wind, *Wind Engineering* 13:1-15, Nov. 1, 1989.

William T. Buttler et al, Remote sensing of three dimensional winds with elastic Lidar: explanation of maximum cross-correlation method, Boundary-Layer Meteorology 101: 305-328, 2001.

Ichiro Matsui et al, Wind profiling by a conical-scanning time correlation Lidar, Japanese journal of applied physics, vol. 29, No. 2, Feb. 1990, pp. 441-444.

Nobuo Sugimoto et al, An improved method for wind measurement with a conical-scanning correlation Lidar, Japanese Journal of applied physics, vol. 37 (1998), pp. 5598-5560.

\* cited by examiner

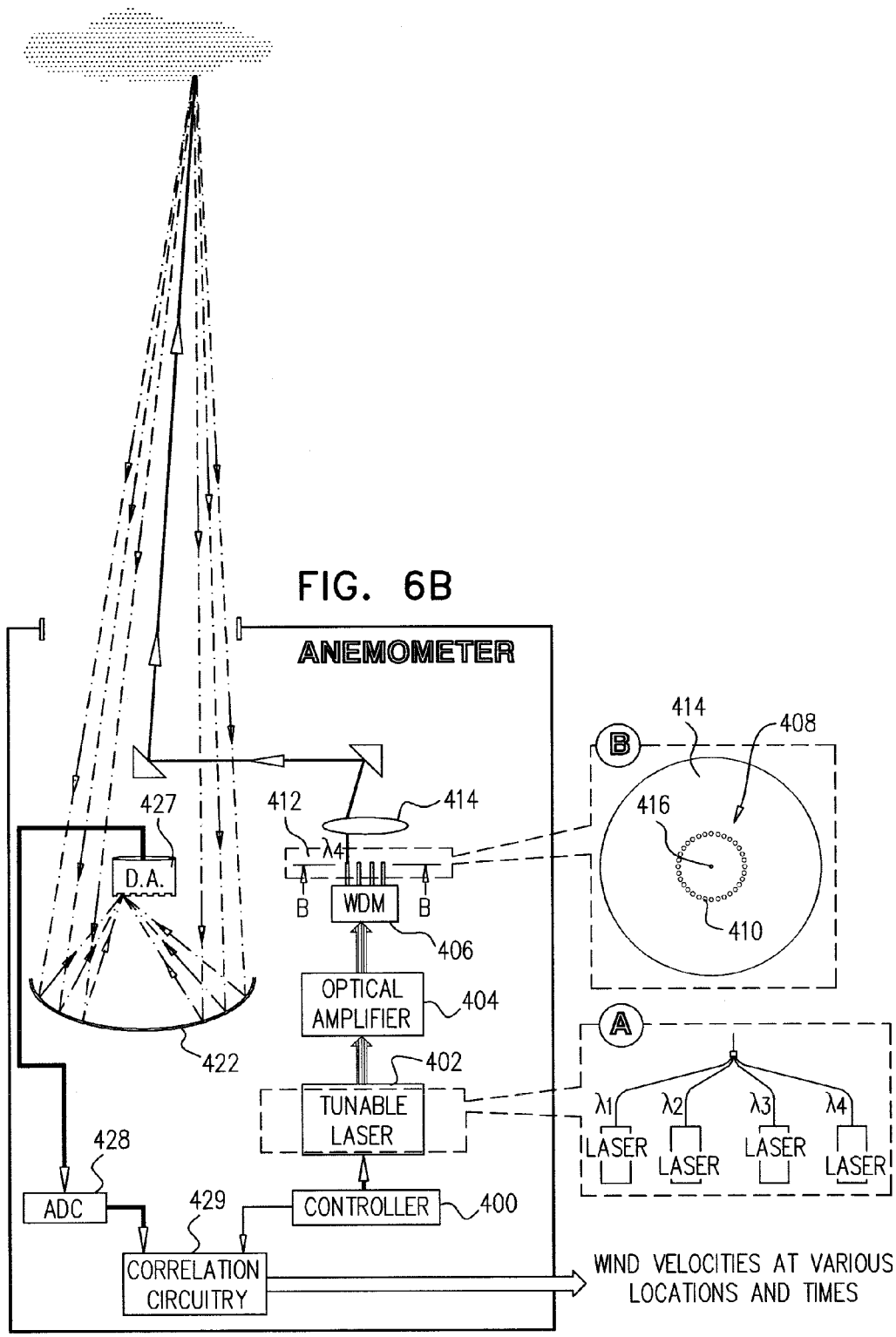

METHODS, DEVICES AND SYSTEMS FOR REMOTE WIND SENSING A LASER ANEMOMETER

REFERENCE TO RELATED APPLICATIONS

Reference is hereby made to U.S. Provisional Patent Application Ser. No. 61/246,174, filed Sep. 28, 2009, entitled Method, Devices, and Systems for Remote Wind Sensing; U.S. Provisional Patent Application Ser. No. 61/285,991, filed Dec. 13, 2009, entitled Method, Devices, and Systems for Remote Wind Sensing; U.S. Provisional Patent Application Ser. No. 61/351,976, filed Jun. 7, 2010, entitled Method, Devices, and Systems for Remote Wind Sensing and U.S. Provisional Patent Application Ser. No. 61/352,396, filed Jun. 8, 2010, entitled Method, Devices, and Systems for Remote Wind Sensing, the disclosures of which are hereby incorporated by reference and priority of which are hereby claimed pursuant to 37 CFR 1.78(a)(4) and (5)(i).

FIELD OF THE INVENTION

The present invention relates to systems and methodologies for monitoring wind characteristics, particularly useful in association with wind turbine installations.

BACKGROUND OF THE INVENTION

The following publications are believed to represent the current state of the art and are hereby incorporated by reference:

U.S. Pat. Nos. 6,320,272; 5,796,471; 7,311,000; 6,946,751; 7,342,323; 7,221,438; 7,281,891; 6,646,725; 7,391,506; 6,687,036; and 4,651,017;
US Published Patent Applications 2007/0158493; 2008/0210881; 2009/0099702; and 2009/0046289;
Japanese Patents JP 11271350 and JP 11133049;
Mayor et al., Two-Dimensional Vector Wind Fields from Volume Imaging Lidar Data, *Journal of Applied Meteorology* 40:1331-1346 (2001);
Piironen et al, Accuracy Analysis of Wind Profiles Calculated from Volume Imaging Lidar Data, *Journal of Geophysical Research* 100:25559-25567; and
Vaughn et al, Laser Doppler Velocimetry Applied to the Measurement of Local and Global Wind, *Wind Engineering* 13:1-15.
William T. Buttler et al, Remote sensing of three dimensional winds with elastic Lidar: explanation of maximum cross-correlation method, Boundary-Layer Meteorology 101: 305-328, 2001
Ichiro Matsui et al, Wind profiling by a conical-scanning time correlation Lidar, Japanese journal of applied physics, Vol 29, No 2, February 1990, pp. 441-444.
Nobuo Sugimoto et al, An improved method for wind measurement with a conical-scanning correlation Lidar, Japanese Journal of applied physics, Vol 37 (1998), pp. 5598-560.
Ting-i Wang, G. R. Ochs, and R. S. Lawrence, Wind measurements by the temporal cross-correlation of the optical scintillations Applied Optics, Vol. 20, Issue 23, pp. 4073-4081 (1981).

SUMMARY OF THE INVENTION

The present invention seeks to provide improved systems and methodologies for monitoring wind characteristics, particularly useful for wind turbine installations.

There is thus provided in accordance with a preferred embodiment of the present invention a system for monitoring wind characteristics in a volume including a plurality of non-coherent laser anemometers operative to measure wind characteristics in a plurality of corresponding sub-volumes located within the volume and a data processing subsystem operative to receive data from the plurality of non-coherent laser anemometers and to provide output data representing the wind characteristics in the volume.

Preferably, the plurality of non-coherent laser anemometers and the data processing subsystem are operative to provide three dimensional wind velocity vectors throughout the volume at a refresh rate of at least one per second. Additionally, the system also includes modeling functionality operative to calculate maximum output power and optimal locations of a plurality of wind turbines.

There is also provided in accordance with another preferred embodiment of the present invention a laser anemometer including a tunable laser, a scanner, receiving an output from the tunable laser and providing laser beam outputs in various scanning directions, and at least one detector for receiving signals from back scattered laser beam outputs.

Preferably, the tunable laser is a wavelength tunable laser and the scanner is a wavelength responsive scanner, receiving the output at multiple wavelengths and providing the laser beam outputs in various scanning directions in accordance with the multiple wavelengths. Additionally, the laser anemometer also includes an anemometer transmission controller operative to provide timed control outputs to the tunable laser.

In accordance with a preferred embodiment of the present invention, the control outputs include a power level, timing and a wavelength of pulse outputs of the tunable laser. Additionally, the laser anemometer also includes an optical amplifier. Additionally or alternatively, the laser anemometer also includes a wavelength division multiplexer coupled to the tunable laser.

Alternatively, the at least one detector includes an array of detectors. Additionally, the laser anemometer also includes an optical filter. Preferably, the laser anemometer also includes correlation circuitry operative to correlate signals received by the at least one detector.

There is further provided in accordance with yet another preferred embodiment of the present invention a laser anemometer including a laser, an optical switch responsive to a control signal for providing laser beams in various scanning directions which are non-coherent when they impinge on particles in the atmosphere, and at least one detector for receiving signals from back scattered laser beam outputs which are not coherent. Additionally, the laser anemometer also includes an optical amplifier. Alternatively, the at least one detector includes an array of detectors. Preferably, the laser anemometer also includes an optical filter. Preferably, the laser anemometer also includes correlation circuitry operative to correlate signals received by the at least one detector.

There is yet further provided in accordance with still another preferred embodiment of the present invention a laser anemometer including a laser, an optical switch having no moving parts and being responsive to a control signal for providing laser beam outputs in various scanning directions, and at least one detector for receiving signals from back scattered laser beam outputs. Preferably, the laser anemometer also includes an optical amplifier. Alternatively, the at least one detector includes an array of detectors. Preferably, the laser anemometer also includes an optical filter. Preferably, the laser anemometer also includes correlation circuitry operative to correlate signals received by the at least one detector.

There is also provided in accordance with another preferred embodiment of the present invention a laser anemometer including a laser, a MEMS optical switch being responsive to a control signal for providing laser beam outputs in various scanning directions, and at least one detector for receiving signals from back scattered laser beam outputs. Preferably, the laser anemometer also includes an optical amplifier. Alternatively, the at least one detector includes an array of detectors. Preferably, the laser anemometer also includes an optical filter. Preferably, the laser anemometer also includes correlation circuitry operative to correlate signals received by the at least one detector.

There is further provided in accordance with yet another preferred embodiment of the present invention a laser anemometer including a laser, a laser beam splitter for providing laser beam outputs simultaneously in a plurality of scanning directions, and a plurality of detectors for receiving signals from back scattering of the laser beam outputs. Preferably, the laser anemometer also includes an optical amplifier. Preferably, the laser anemometer also includes an optical filter. Preferably, the laser anemometer also includes correlation circuitry operative to correlate signals received by the detector.

There is yet further provided in accordance with still another preferred embodiment of the present invention a system for controlling operation of multiple wind turbines including a plurality of anemometers operative to measure wind characteristics at least a plurality of locations, a data processing subsystem operative to receive data from the plurality of anemometers and to provide output data representing the wind characteristics at the plurality of locations, and a control subsystem receiving the output data from the data processing subsystem and providing wind turbine control signals to a plurality of wind turbines located in at least general propinquity to the plurality of locations.

In accordance with a preferred embodiment of the present invention, the plurality of anemometers includes a plurality of laser anemometers. Preferably, the plurality of laser anemometers includes at least one non-coherent laser anemometer. Additionally, the data processing subsystem receives the data from the plurality of anemometers via a wireless communication link. Preferably, the plurality of anemometers includes at least one anemometer oriented in a horizontal direction. Additionally, the plurality of anemometers includes at least one anemometer oriented in a vertical direction.

Preferably, the wind turbine control signals include at least one of a rotor alignment signal, a blade pitch signal and a rotor lock signal. Additionally, the data processing subsystem is operative to receive the data at a refresh rate of at least one per second, and the control subsystem is operative to provide the wind turbine control signals at a refresh rate of between one per second and one per several minutes. Preferably, the data processing subsystem is operative to perform aerodynamic calculations to provide the data output.

There is also provided in accordance with another preferred embodiment of the present invention a laser anemometer system for monitoring wind velocity including at least one laser directing at least one beam of laser illumination outwardly from at least one location, at least one laser illumination receiver receiving reflections of the laser illumination from particles in the atmosphere located at various distances from the at least one location, and correlation circuitry operative to correlate outputs from the at least one laser illumination representing reflections from different ones of the various distances from the at least one location, thereby providing an output indication of wind velocity along at least one direction approaching the location.

In accordance with a preferred embodiment of the present invention, the correlation circuitry is operative to generate a correlation graph. Preferably, the correlation graph is a graph of the correlation function $C(\tau)$ mathematically described as follows:

$$C(\tau) = \frac{\sum_{i=0}^{n} [I_A(t_i + \tau) - \bar{I}_A][I_B(t_i) - \bar{I}_B]}{\sqrt{\sum_{i=0}^{n} [I_A(t_i) - \bar{I}_A]^2 \sum_{i=0}^{n} [I_B(t_i) - \bar{I}_B]^2}}$$

where:

$I_A$ and $I_B$ are the intensities of reflected laser beams from locations A and B in space, respectively, as a function of time;

$t_i$ marks one of n points in time at which samples of reflections are recorded; $\bar{I}_A$ and $\bar{I}_B$ are the average intensities of the reflections from locations A and B respectively over n samples recorded at the n points in time; and $\tau$ is a time difference parameter for which the correlation function is being calculated and $\tau$ may be either positive or negative.

There is further provided in accordance with yet another preferred embodiment of the present invention a method for monitoring wind characteristics in a volume including utilizing a plurality of non-coherent laser anemometers to measure wind characteristics in a plurality of corresponding sub-volumes located within the volume, and utilizing a data processing subsystem to receive data from the plurality of non-coherent laser anemometers to provide output data representing the wind characteristics in the volume.

Preferably, the plurality of non-coherent laser anemometers and the data processing subsystem are operative to provide three dimensional wind velocity vectors throughout the volume at a refresh rate of at least one per second. Additionally, the method also includes calculating maximum output power and optimal locations of a plurality of wind turbines.

There is yet further provided in accordance with still another preferred embodiment of the present invention a method for controlling operation of multiple wind turbines including utilizing a plurality of anemometers to measure wind characteristics at least a plurality of locations, utilizing a data processing subsystem to receive data from the plurality of anemometers and to provide output data representing the wind characteristics at the plurality of locations, and utilizing a control subsystem to receive the output data from the data processing subsystem and to provide wind turbine control signals to a plurality of wind turbines located in at least general propinquity to the plurality of locations.

In accordance with a preferred embodiment of the present invention, the plurality of anemometers includes a plurality of laser anemometers. Preferably, the plurality of laser anemometers includes at least one non-coherent laser anemometer. Additionally, the data processing subsystem receives the data from the plurality of anemometers via a wireless communication link. Preferably, the plurality of anemometers includes at least one anemometer oriented in a horizontal direction. Additionally, the plurality of anemometers includes at least one anemometer oriented in a vertical direction.

Preferably, the wind turbine control signals include at least one of a rotor alignment signal, a blade pitch signal and a rotor lock signal. Additionally, the data processing subsystem is operative to receive the data at a refresh rate of at least one per second, and the control subsystem is operative to provide the wind turbine control signals at a refresh rate of between one per second and one per several minutes. Preferably, the data processing subsystem is operative to perform aerodynamic calculations to provide the data output.

There is also provided in accordance with another preferred embodiment of the present invention a laser anemometer method for monitoring wind velocity including utilizing at least one laser to direct at least one beam of laser illumination outwardly from at least one location, utilizing at least one laser illumination receiver to receive reflections of the laser illumination from particles in the atmosphere located at various distances from the at least one location, and utilizing correlation circuitry to correlate outputs from the at least one laser illumination representing reflections from different ones of the various distances from the at least one location, thereby providing an output indication of wind velocity along at least one direction approaching the location.

In accordance with a preferred embodiment of the present invention, the correlation circuitry is operative to generate a correlation graph. Preferably, the correlation graph is a graph of the correlation function C(τ) mathematically described as follows:

$$C(\tau) = \frac{\sum_{i=0}^{n}[I_A(t_i+\tau)-\bar{I}_A][I_B(t_i)-\bar{I}_B]}{\sqrt{\sum_{i=0}^{n}[I_A(t_i)-\bar{I}_A]^2 \sum_{i=0}^{n}[I_B(t_i)-\bar{I}_B]^2}}$$

where:

$I_A$ and $I_B$ are the intensities of reflected laser beams from locations A and B in space, respectively, as a function of time;

$t_i$ marks one of n points in time at which samples of reflections are recorded; $\bar{I}_A$ and $\bar{I}_B$ are the average intensities of the reflections from locations A and B respectively over n samples recorded at the n points in time; and τ is a time difference parameter for which the correlation function is being calculated and τ may be either positive or negative.

BRIEF DESCRIPTION OF THE DRAWINGS

The present invention will be understood and appreciated more fully from the following detailed description, taken in conjunction with the drawings in which:

FIGS. 6A & 6B are simplified, partially pictorial, partially schematic illustrations of the structure and operation of an alternative embodiment of a non-coherent laser anemometer for monitoring wind characteristics including correlation circuitry operative for providing output indications of wind velocity;

DETAILED DESCRIPTION OF PREFERRED EMBODIMENTS

Figure 1:
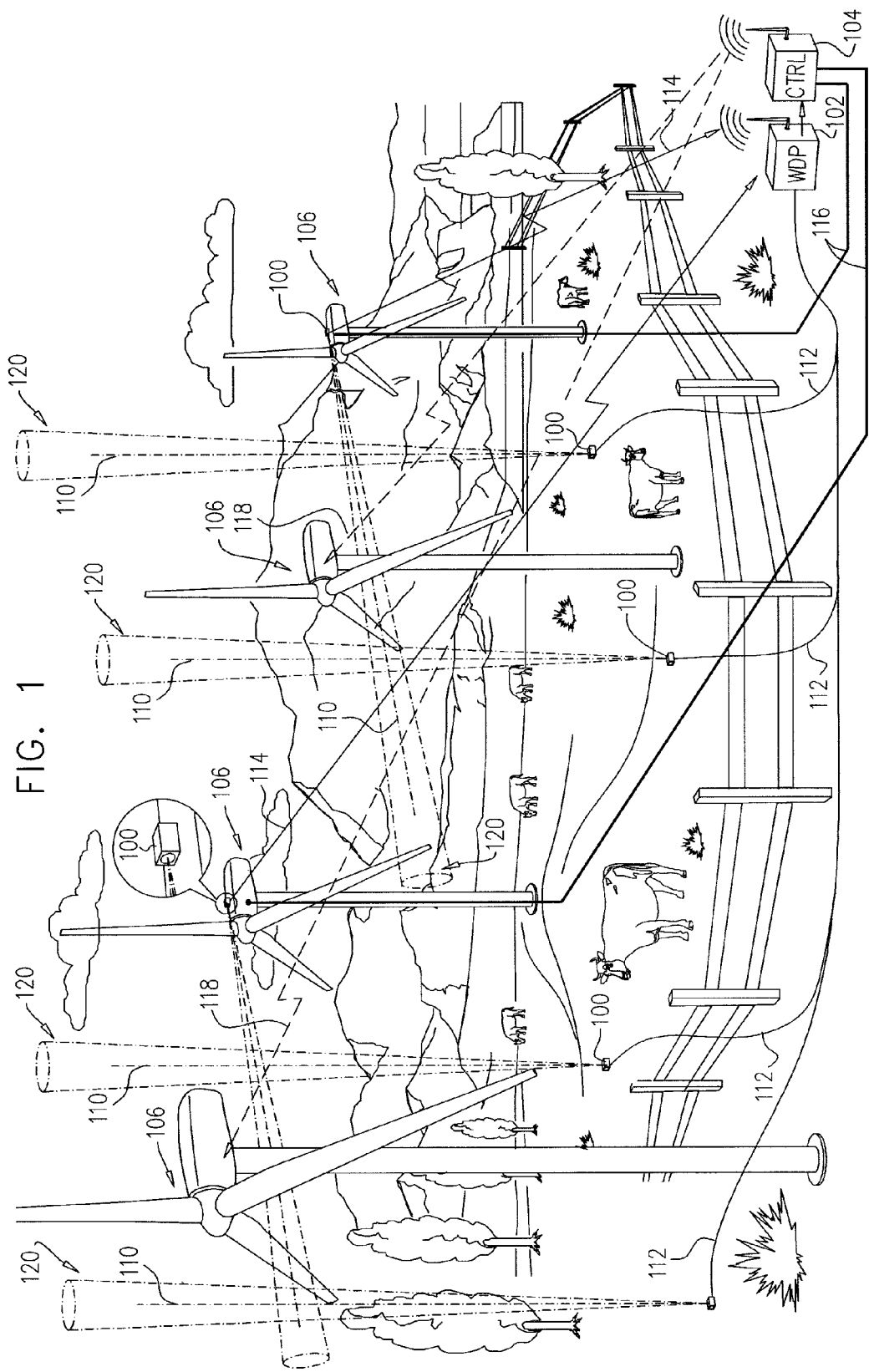
FIG. 1 is a simplified, partially pictorial, partially schematic, illustration of a system for controlling operation of multiple wind turbines based on monitored wind characteristics, constructed and operative in accordance with a preferred embodiment of the present invention.

Reference is now made to FIG. 1, which is a simplified, partially pictorial, partially schematic, illustration of a system for controlling operation of multiple wind turbines based on monitored wind characteristics, constructed and operative in accordance with a preferred embodiment of the present invention.

The system preferably includes a plurality of anemometers 100 operative to measure wind characteristics at a multiplicity of locations, preferably at least one wind data processing subsystem 102, operative to receive data from the plurality of anemometers 100 and to provide output data representing the wind characteristics at the multiplicity of locations and preferably at least one control subsystem 104, receiving the output data from the wind data processing subsystem 102 and providing wind turbine control signals to a plurality of wind turbines 106 located in at least general propinquity to the plurality of anemometers.

As seen in FIG. 1, the anemometers 100 are preferably laser anemometers, each of which provides an output indicating wind velocity at various locations along a measurement axis 110. The outputs of the plurality of laser anemometers 100 are supplied to the at least one wind data processing subsystem 102 via wired or wireless communication links, respectively designated by reference numerals 112 and 114. The at least one control subsystem 104, in turn, may provide control inputs to the plurality of wind turbines 106, via wired or wireless communication links, respectively designated by reference numerals 116 and 118. It is appreciated that laser anemometers 100 may be located at various positions, such as on the ground or on nacelles of the wind turbines 106.

Control inputs supplied to wind turbines 106 by the at least one control subsystem 104 include data representing the anticipated wind characteristics in the immediate vicinity of each of the wind turbines 106, which data is used to align the rotor of each of the wind turbines 106 in a plane generally perpendicular to the direction of the incoming wind, thereby maximizing the amount of wind power that is effective in rotating the rotor of each of the wind turbines 106, thereby in turn maximizing the amount of electricity that can be generated by the wind turbine 106. The alignment of a rotor is preferably accomplished by a yaw motor provided with each of the wind turbines 106.

Additionally, the data is used to control the pitch of each of the blades of the rotor of each of the wind turbines 106, thereby maximizing the amount of electricity that can be generated by each of the wind turbines 106 while balancing the load on each of the blades of the rotor. The data may also be used by each of the wind turbines 106 to lock the rotor, thereby preventing it from rotating, when the wind is too weak to generate significant rotation of the rotor or when the wind is too strong to safely operate the turbine without it being damaged.

It is a particular feature of one embodiment of the present invention that the plurality of laser anemometers 100 includes non-coherent laser anemometers. Non-coherent laser anemometers provide mutually non-coherent multiple laser beams in an anemometer measurement volume 120. The anemometer measurement volume is typically a cone, centered about a measurement axis 110, extending typically up to 300 meters and subtending an opening angle of approximately 14 degrees. The multiple laser beams typically extend along the periphery of the cone.

It is a particular feature of the present invention that the wind data processing subsystem 102 is operative to receive data from the plurality of laser anemometers 100 and to provide output data representing the wind characteristics at various points to the control unit 104, as illustrated in FIG. 1.

More particularly, it is a particular feature of the present invention that the at least one wind data processing subsystem 102 may provide three dimensional wind velocity measurements to the control unit 104, preferably at a refresh rate of at least one per second, and by this feature to provide control to the turbines at a refresh rate of between one per second and one per several minutes.

Figure 2:
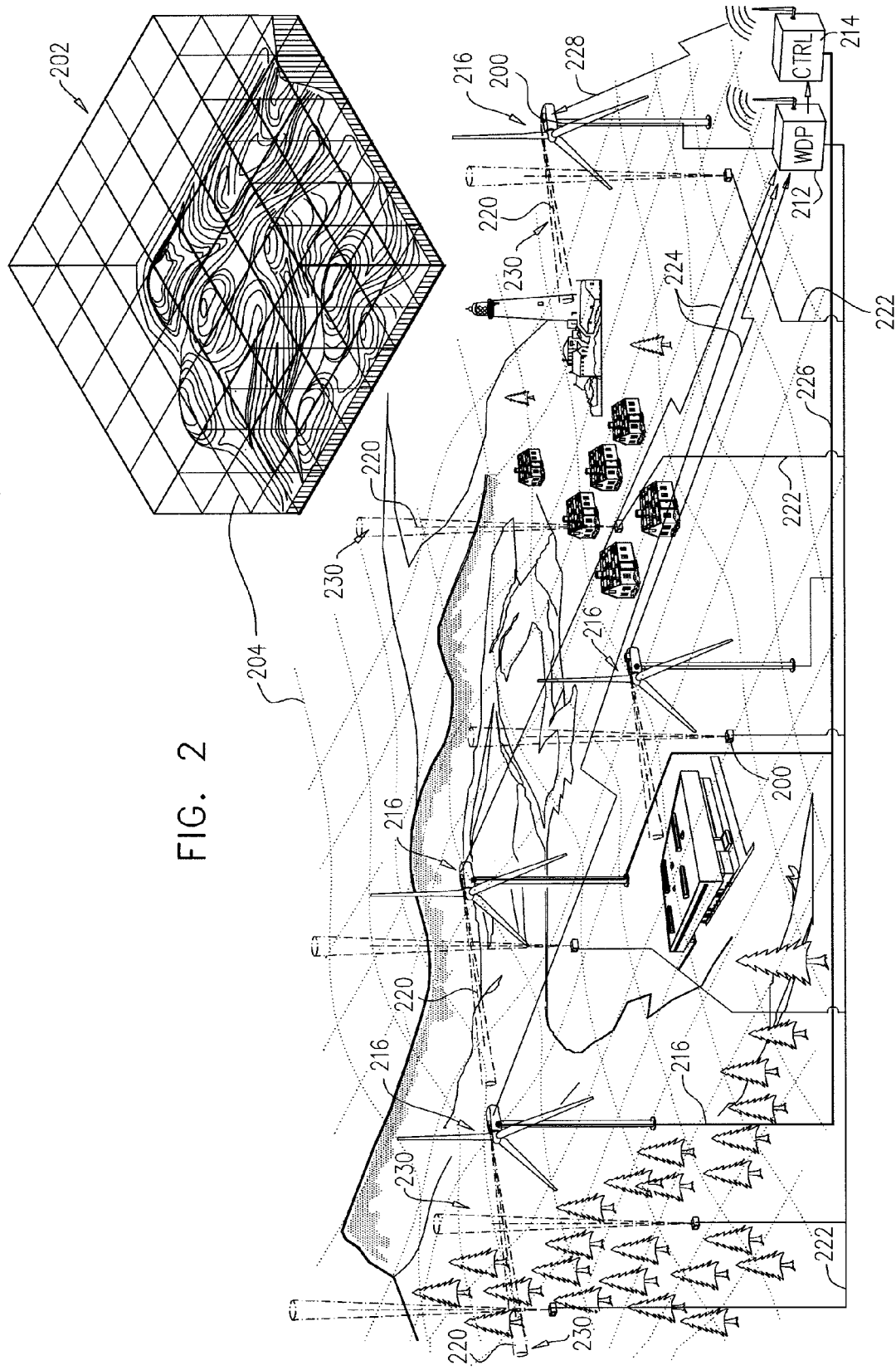
FIG. 2 is a simplified, partially pictorial, partially schematic, illustration of a system for monitoring wind characteristics for short-range wind vector forecasting, constructed and operative in accordance with a preferred embodiment of the present invention.

Reference is now made to FIG. 2, which is a simplified, partially pictorial, partially schematic, illustration of a system for monitoring wind characteristics by short range, in time and/or space, wind vector forecasting, constructed and operative in accordance with a preferred embodiment of the present invention. For example, such short range wind vector forecasting is particularly useful for predicting the power that will be generated by a wind farm within the next several tens of seconds, minutes or hours, and thus facilitates optimal integration of the power output of the wind farm within a larger scale electricity grid. Additionally, this forecasting enables the optimization of the operation of wind turbines in the wind farm in response to the anticipated forecasted wind characteristics.

The system of FIG. 2 preferably includes a plurality of anemometers 200 operative to measure wind characteristics at a multiplicity of locations distributed throughout a forecasting volume 202, which may be envisaged as being overlaid by a three dimensional grid 204. Typically the size of forecasting volume 202 is at least of the order of cubic kilometers and the length of individual grid units is at least of the order of tens of meters, however, additional anemometers may be located up to several kilometers away from the wind farm and provide data on wind characteristics that are anticipated to arrive in the farm at later times.

Preferably, at least one wind data processing subsystem 212 is operative to receive data from the plurality of anemometers 200 and by performing aerodynamic calculations on the data to provide output data representing forecasted wind characteristics at the multiplicity of locations, and optionally at least one control subsystem 214, receiving the output data from the at least one wind data processing subsystem 212 and on the basis of the forecasted wind characteristics providing wind turbine control signals to a plurality of wind turbines 216 located in at least general propinquity to the plurality of anemometers 200. Output data provided by data processing subsystem 212 is also useful in providing forecasting of the amount of electric power anticipated to be generated by the wind farm, which is useful in facilitating trading and selling the generated power in the electricity spot market.

As seen in FIG. 2, the anemometers 200 are preferably laser anemometers, each of which provides an output indicating wind velocity at various locations along a measurement axis 220. The outputs of the plurality of laser anemometers 200 are supplied to the at least one wind data processing subsystem 212 via wired or wireless communication links, respectively designated by reference numerals 222 and 224. The at least one control subsystem 214, in turn, may provide control inputs to the plurality of wind turbines 216, via wired or wireless communication links, respectively designated by reference numerals 226 and 228. It is appreciated that laser anemometers 200 may be located at various positions, such as on the ground or on nacelles of the wind turbines 216.

Control inputs supplied to wind turbines 216 by the at least one control subsystem 214 include data representing the forecasted wind characteristics in the immediate vicinity of each of the wind turbines 216 which data is used to align the rotor of each of the wind turbines 216 in a plane generally perpendicular to the direction of the incoming wind, thereby maximizing the amount of wind power that is effective in rotating the rotor of each of the wind turbines 216, thereby in turn, maximizing the amount of electricity that can be generated by the wind turbine 216. The alignment of a rotor is preferably accomplished by a yaw motor provided with each of the wind turbines 206.

Additionally, the data is used to control the pitch of each of the blades of the rotor of each of the wind turbines 216, thereby maximizing the amount of electricity that can be generated by each of the wind turbines 216 while balancing the load on each of the blades of the rotor. The data may also be used by each of the wind turbines 216 to lock the rotor, thereby preventing it from rotating, when the wind is too weak to generate significant rotation of the rotor or when the wind is too strong to safely operate the turbine without it being damaged.

It is a particular feature of one embodiment of the present invention that the plurality of laser anemometers 200 includes non-coherent laser anemometers. Non-coherent laser anemometers provide mutually non-coherent multiple laser beams in an anemometer measurement volume 230. The anemometer measurement volume is typically a cone, centered about a measurement axis 220, extending typically up to 300 meters and subtending an opening angle of approximately 14 degrees. The multiple laser beams typically extend along the periphery of the cone.

It is a particular feature of the present invention that that the wind data processing subsystem 212 is operative to receive data from the plurality of laser anemometers 200 and to provide output data representing the wind characteristics at various points on the grid 204 of the forecasting volume 202, which may encompass one or more wind farms, as illustrated in FIG. 2.

More particularly, it is a particular feature of the present invention that the at least one wind data processing subsystem 212 may provide three dimensional wind velocity vectors throughout the forecasting volume 202, preferably at a refresh rate of at least one per second. Such wind velocity vectors are preferably provided for every point on three-dimensional grid 204 and may represent measured real time velocity vectors and/or predicted wind velocity vectors. This feature allows for flexible placement of laser anemometers 200 which can be located on the ground and not necessarily on the nacelles of wind turbines 216, thereby enabling easier deployment and integration of laser anemometers 200 into an existing wind farm.

Figure 3:
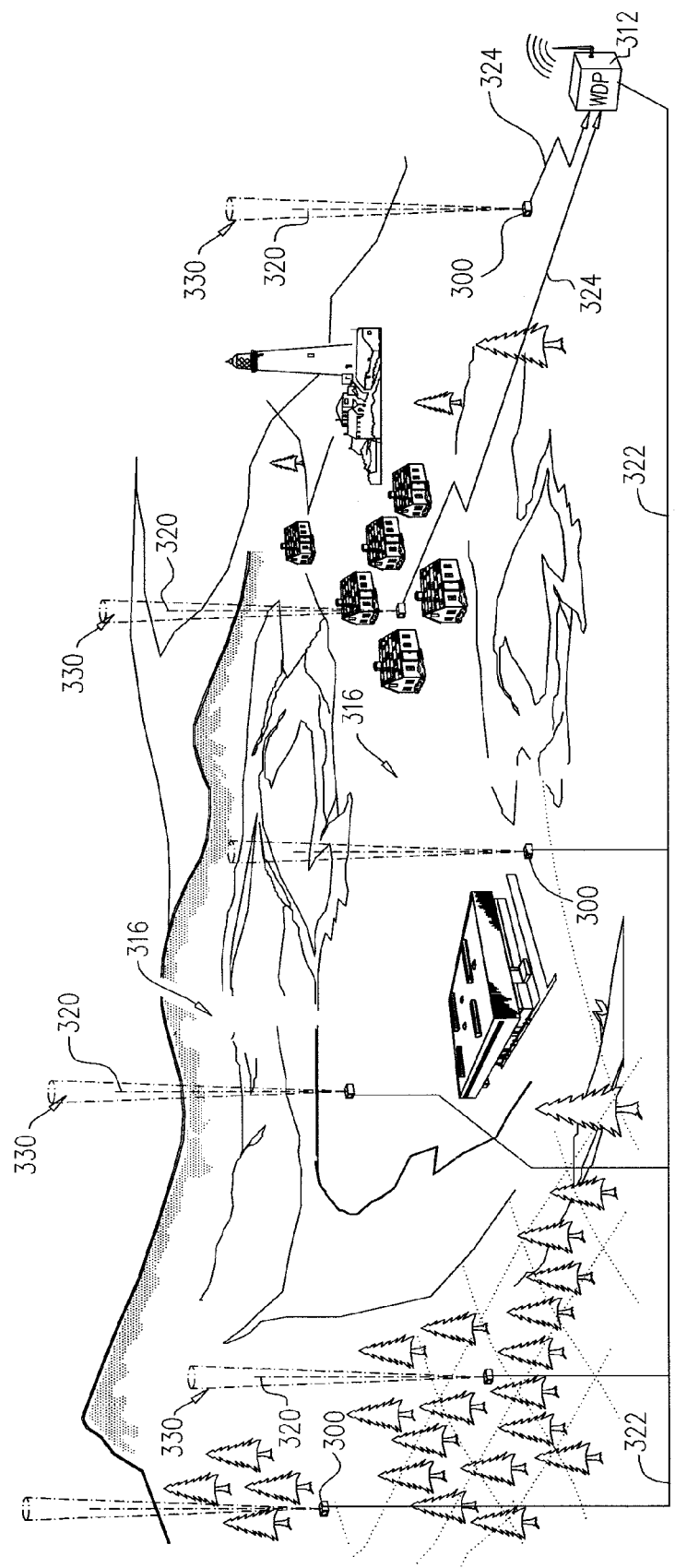
FIG. 3 is a simplified, partially pictorial, partially schematic, illustration of a system for monitoring of wind characteristics for use in assessing available wind resources in a variety of locations in a prospective wind farm, constructed and operative in accordance with a preferred embodiment of the present invention.

Reference is now made to FIG. 3, which is a simplified, partially pictorial, partially schematic, illustration of a system for monitoring of wind characteristics for use in assessing available wind resources in a variety of locations in a prospective wind farm, constructed and operative in accordance with a preferred embodiment of the present invention.

The system of FIG. 3 preferably includes a plurality of anemometers 300 operative to measure wind characteristics at a multiplicity of locations distributed throughout a potential wind farm.

At least one wind data processing subsystem 312 is operative to receive data from the plurality of anemometers 300 and to provide output data representing the wind characteristics at the multiplicity of locations which output data is useful in assessing available wind resources within the potential wind farm.

As seen in FIG. 3, the anemometers 300 are preferably laser anemometers, each of which provides an output indicating wind velocity at various locations along a measurement axis 320. The outputs of the plurality of laser anemometers 300 are supplied to the at least one wind data processing subsystem 312 via wired or wireless communication links, respectively designated, by reference numerals 322 and 324. It is appreciated that laser anemometers 300 may be located at various positions within the potential wind farm.

It is a particular feature of one embodiment of the present invention that the plurality of laser anemometers 300 includes non-coherent laser anemometers. Non-coherent laser anemometers provide mutually non-coherent multiple laser beams in an anemometer measurement volume 330. The anemometer measurement volume is typically a cone, centered about measurement axis 320, extending typically up to 300 meters and subtending an angle of approximately 14 degrees. The multiple laser beams typically extend along the periphery of the cone.

It is another particular feature of the present invention that the wind data processing subsystem 312 is operative to receive data from the plurality of laser anemometers 300 and to provide data relating to available wind resources to a user. The wind data processing subsystem may be located within the potential wind farm or at a location which is remote from the potential wind farm.

It is yet another particular feature of the present invention that the wind data processing sub system 312 may use data received from the plurality of laser anemometers 300 to calculate several important parameters such as wind shear and wind veer in the wind farm, as well as the strength of wind turbulence in the wind farm and locations within the wind farm which have stronger wind gusts or a higher turbulence flow that may negatively affect the performance of wind turbines that will be placed at such locations.

Figure 4:
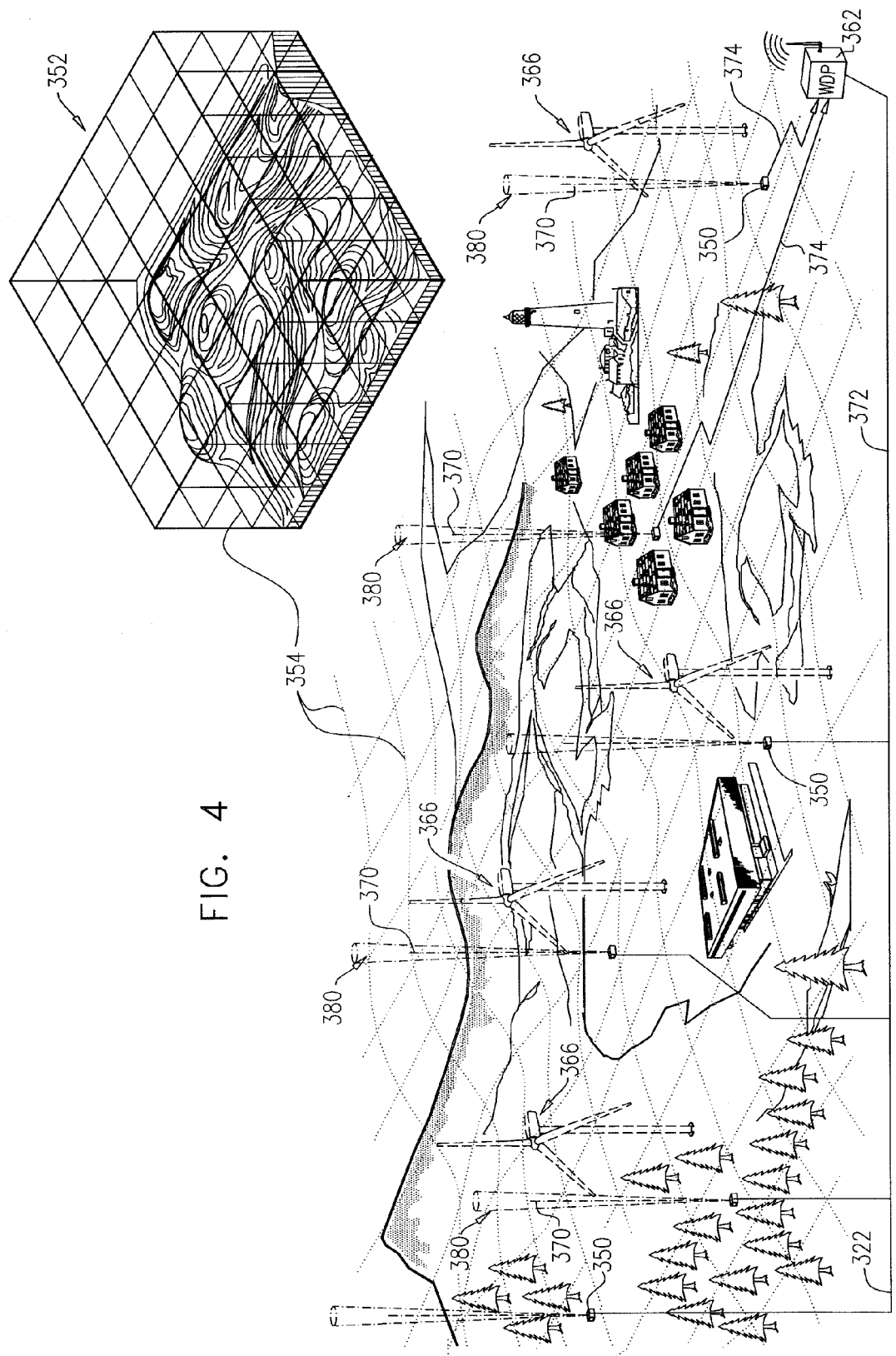
FIG. 4 is a simplified, partially pictorial, partially schematic, illustration of a system for monitoring wind characteristics for use in planning placement of wind turbines, constructed and operative in accordance with a preferred embodiment of the present invention.

Reference is now made to FIG. 4, which is a simplified, partially pictorial, partially schematic, illustration of a system for monitoring wind characteristics for placement of wind turbines, constructed and operative in accordance with a preferred embodiment of the present invention.

The system of FIG. 4 preferably includes a plurality of anemometers 350 operative to measure wind characteristics at a multiplicity of locations distributed throughout a potential wind farm volume 352, which may be envisaged as being overlaid by a three dimensional grid 354. Typically the size of potential wind farm volume 352 is at least of the order of cubic kilometers and the length of individual grid units is at least of the order of tens of meters.

At least one wind data processing subsystem 362 is operative to receive data from the plurality of anemometers 350 and to provide output data representing the wind characteristics at the multiplicity of locations which output data is useful in design and placement of a plurality of future wind turbines 366, shown in dashed lines.

As seen in FIG. 4, the anemometers 350 are preferably laser anemometers, each of which provides an output indicating wind velocity at various locations along a measurement axis 370. The outputs of the plurality of laser anemometers 350 are supplied to the at least one wind data processing subsystem 362 via wired or wireless communication links, respectively designated by reference numerals 372 and 374. It is appreciated that laser anemometers 350 may be located at various positions within the potential wind farm volume 352.

It is a particular feature of one embodiment of the present invention that the plurality of laser anemometers 350 includes non-coherent laser anemometers. Non-coherent laser anemometers provide mutually non-coherent multiple laser beams in an anemometer measurement volume 380. The anemometer measurement volume is typically a cone, centered about measurement axis 370, extending typically up to 300 meters and subtending an angle of approximately 14 degrees. The multiple laser beams typically extend along the periphery of the cone.

It is a particular feature of the present invention that the wind data processing subsystem 362 is operative to receive data from the plurality of laser anemometers 350 and to provide output data representing the wind characteristics at various points on the grid 354 of the potential wind farm volume 352, as illustrated in FIG. 4.

More particularly, it is a particular feature of the present invention that the at least one wind data processing subsystem 362 may provide three dimensional wind velocity vectors throughout the forecasting volume 352, preferably at a refresh rate of at least one per second. Such wind velocity vectors are preferably provided for every point on three-dimensional grid 354 and may represent measured real time velocity vectors and/or predicted wind velocity vectors. Such a three dimensional wind velocity vector map within the prospective wind farm volume 352 can support a mathematical model that calculates optimal potential locations of the plurality of future wind turbines 366 within the potential wind farm volume 352, based on the maximum output power that future wind turbines 366 can potentially produce when operational under the measured and predicted wind vectors accumulated over time by the data processing subsystem 362.

Figure 5A:
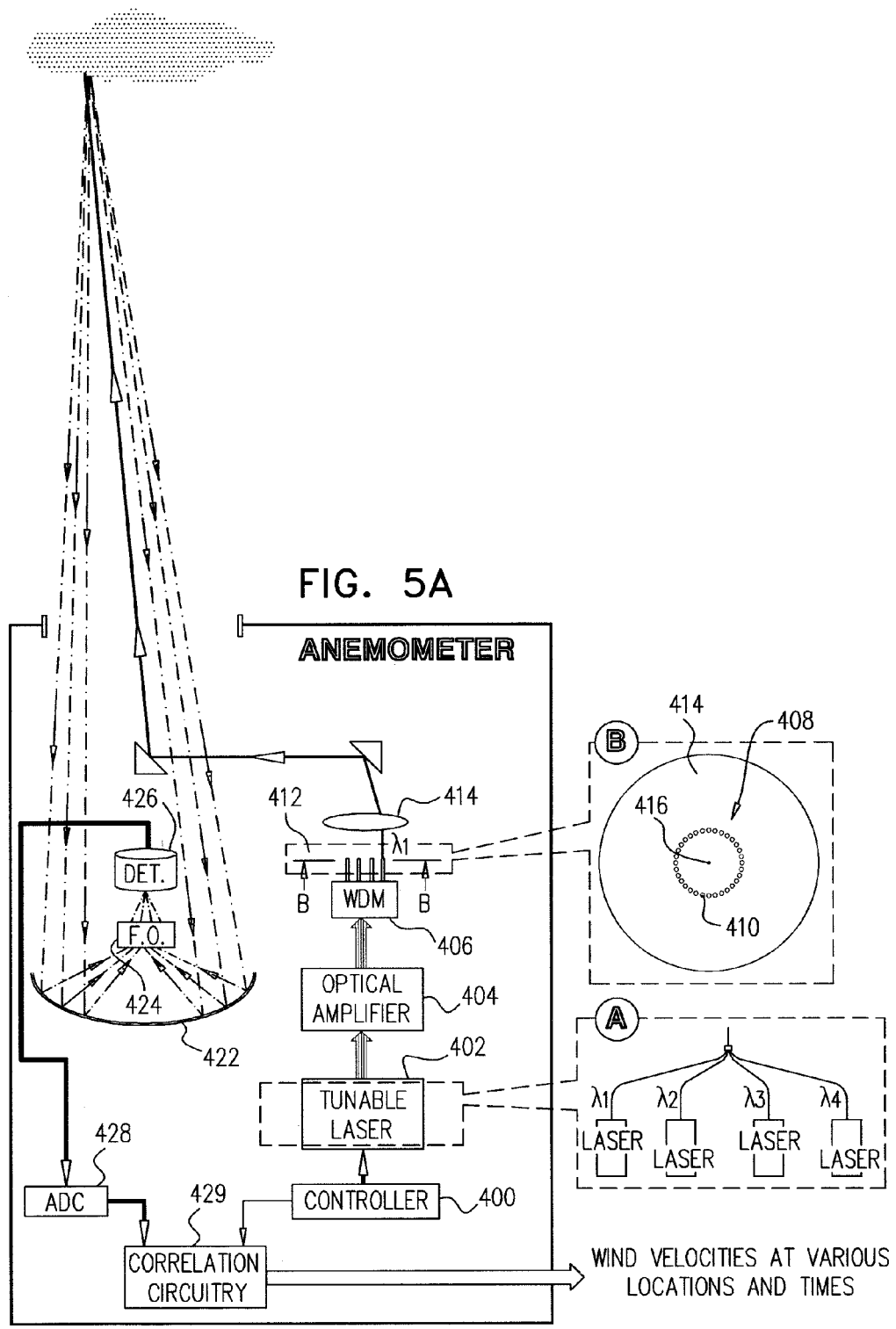
FIGS. 5A & 5B are simplified, partially pictorial, partially schematic illustrations of the structure and operation of one embodiment of a non-coherent laser anemometer for monitoring wind characteristics including correlation circuitry operative for providing output indications of wind velocity.
Figure 5B:
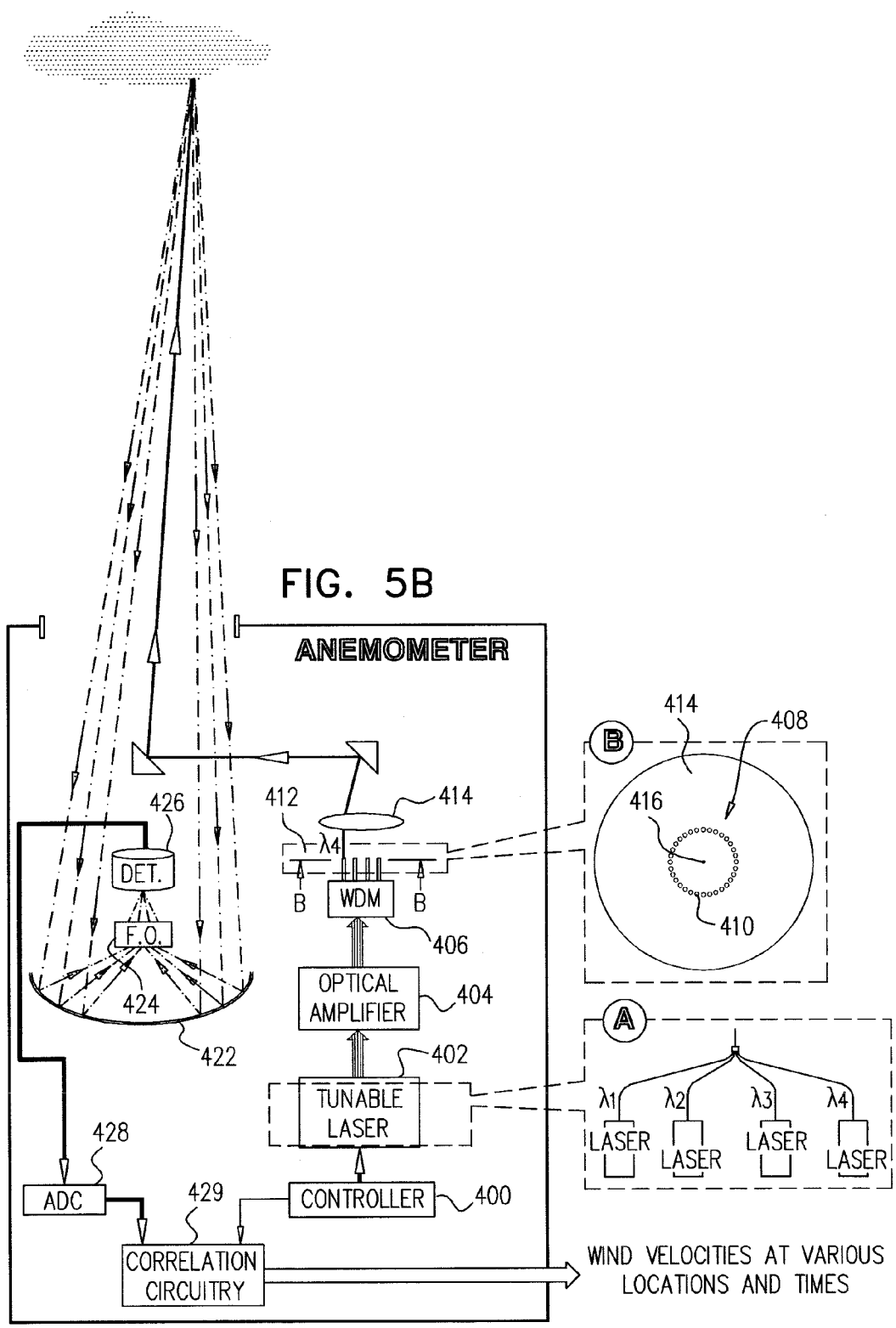
Figure 6A:
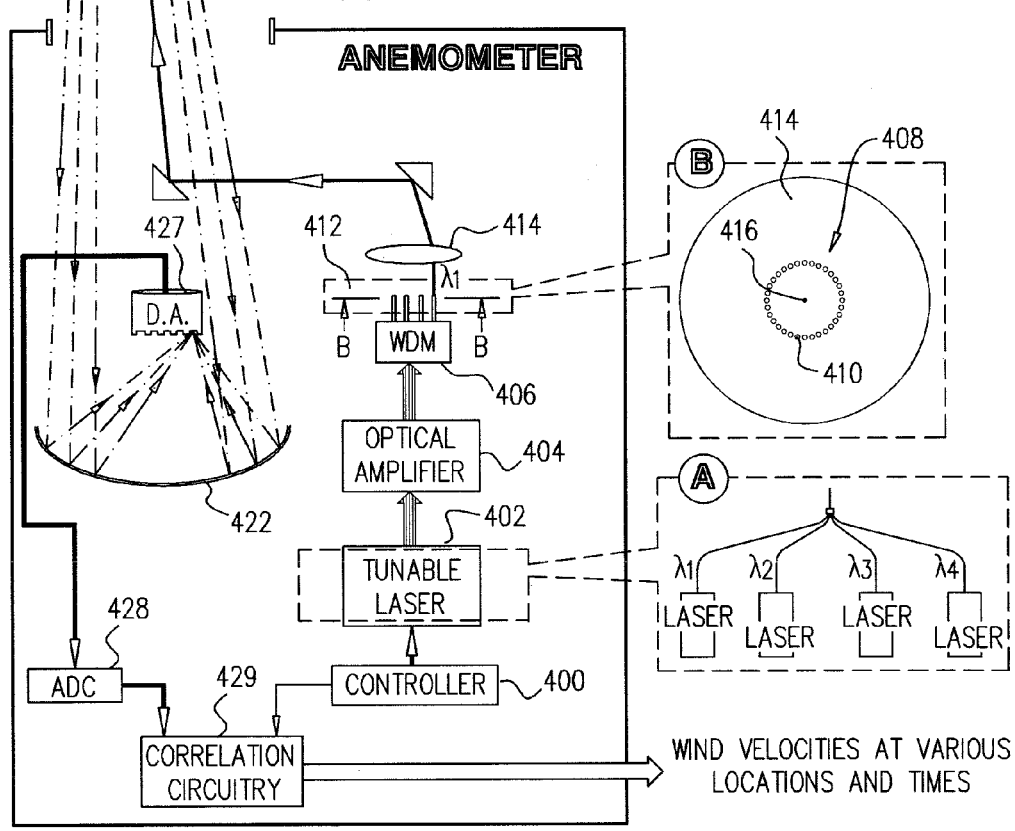

Reference is now made to FIGS. 5A & 5B, which are simplified, partially pictorial, partially schematic illustrations of the structure and operation of one embodiment of a non-coherent laser anemometer for monitoring wind characteristics including correlation circuitry operative for providing output indications of wind velocity, and to FIGS. 6A & 6B, which are simplified, partially pictorial, partially schematic illustrations of the structure and operation of an alternative embodiment of a non-coherent laser anemometer for monitoring wind characteristics including correlation circuitry operative for providing output indications of wind velocity.

As seen in FIGS. 5A-6B, an anemometer transmission controller 400, including a master oscillator and time setting circuitry, provides timed control outputs to a tunable laser 402, such as a 3205-D or 3206-D Tunable Laser, commercially available from JDS Uniphase Corporation of Milpitas, Calif., USA. The control outputs preferably control the power level, timing and wavelength of pulse outputs of the tunable laser 402. The pulse outputs of tunable laser 402 are typically carried by an optical fiber to an optical amplifier 404, such as a High Power Variable Gain/Fixed Gain EDFA, commercially available from Red-C Optical Networks Ltd. of Israel. It is appreciated that any other suitable optical amplifier may be employed. It is also appreciated that the optical amplifier 404 may be obviated where laser 402 generates sufficient power. Alternatively, any other suitable tunable laser or collection of individual fixed wavelength lasers may be employed. For example, the four individual lasers shown in Enlargement A of FIGS. 5A-6B provide laser output beams having four different wavelengths $\lambda_1$, $\lambda_2$, $\lambda_3$ and $\lambda_4$. Preferably, 32 different wavelengths are employed. All of these alternatives are collectively included in the term "tunable laser" as used throughout.

An amplified laser output of optical amplifier 404 is preferably carried by an optical fiber to a Wavelength Division Multiplexer 406, such as a 100 GHz Athermal Arrayed Waveguide Grating from Gemfire Corporation of Fremont, Calif., USA.

The outputs of multiplexer 406 are a plurality of pulsed beams, each of a different wavelength, each of which is preferably carried by a separate optical fiber. Preferably, a bundle 408 of 32 separate optical fibers 410 is employed to carry a corresponding number of pulsed laser output beams having different wavelengths. Ends of the individual fibers 410 of bundle 408 lie in the focal plane 412 of a lens 414 in a desired, preferably circular, configuration arranged to provide an optical output of lens 414 having 32 non-mutually coherent pulsed beams arranged about a conical surface. Alternatively, a cascade of lenses may be provided instead of lens 414. Enlargement B, taken in the focal plane 412, as designated by section lines B-B, facing lens 414, shows fibers 410 and the lens 414, the circular arrangement of the fibers being centered on the optical axis of lens 412, which is designated by reference numeral 416.

It is a further particular feature of the embodiments of FIGS. 5A-6B that the multiple pulsed laser outputs are realized using a tunable laser whose output is coupled to a wavelength division multiplexer.

It is yet a further particular feature of the embodiments of FIGS. 5A-6B that the pulsed laser outputs are distributed and channeled according to their wavelength by an apparatus, such as a wavelength division multiplexer, having no moving parts and thereby being suitable for use in rugged and relatively inaccessible environments.

It is appreciated that any suitable desired pattern or structure of pulsed laser beam outputs may be realized in this way by suitable arrangement of the ends of the fibers 410 in the focal plane 412 of a suitable lens 414. It is also appreciated that the ends of the fibers 410 in the focal plane 412 of the lens 414 may be tilted in a way that enhances the capability of the lens 414 to collect light emitting from the plurality of fibers 410, thereby allowing lens 414 to be of a relatively simple and cheap design, which in turn allows for an anemometer design which is more robust and cheaper, and thereby being better suited for mass market use.

The optical output of lens 412 typically impinges on one or more folding mirrors which direct the pulsed beams outwardly about a conical surface having a central axis (not shown). The pulsed beams typically impinge on particles, such as molecules of air or molecules or aerosols in the air, and are reflected thereby. Alternatively, the folding mirrors may be obviated and/or the lens may be replaced by one or more mirrors having optical power.

As shown in FIGS. 5A & 5B, reflection collection optics, preferably embodied in a mirror 422, receive reflections of the pulsed laser beams from aerosols in the air and directs them optionally via focusing optics 424, typically comprising at least one lens, preferably to a detector 426, typically an InGaAs APDs detector or an InGaAs PIN diode detector operating at 1100-1700 nanometers, both commercially available from Laser Components IG Inc. of Hudson, N.H., USA. Alternatively, as shown in FIGS. 6A & 6B, focusing optics 424 may be obviated and an array 427 of detectors may be employed instead of detector 426.

It is appreciated that the embodiments described in FIGS. 5A-6B may include an optical filter which filters out light of wavelengths outside the range of wavelengths generated by the anemometer before such light reaches detector 426 or array of detectors 427, thereby reducing the amount of background noise received by detector 426 or array of detectors 427.

An amplified output from one or more detectors 426 is supplied via an A/D converter 428, to correlation circuitry 429, which is operative to correlate signals derived from reflections from the variously directed pulsed beams in order to provide information as to direction and speed of movement of aerosols in the air, which information represents wind velocity. Correlation circuitry 429 is preferably embodied in software resident on a programmable processor chip, such as an FPGA. Additionally, other processing components such as a DSP or a CPU may be employed to perform at least part of the required correlation calculations in real time.

It is a particular feature of the present invention that correlation circuitry 429 is operative to correlate between reflections received from locations at same or different distances along a single pulsed beam and at locations at same or different distances at different pulsed beams and at different time intervals which represent a range of wind speeds which are to be measured. Preferably a result of the correlation performed in accordance with a preferred embodiment of the present invention is a vector at every location along the axis of the conical volume at which wind velocity is measured, which indicates wind velocity.

It is another particular feature of the present invention that the correlation is performed on pulsed laser beams which are not mutually coherent. This enables use of a laser and optics in the anemometer which are very substantially less expensive and which can operate at lower signal to noise ratios, than lasers and optics currently employed in conventional Doppler laser anemometers.

Figure 7A:
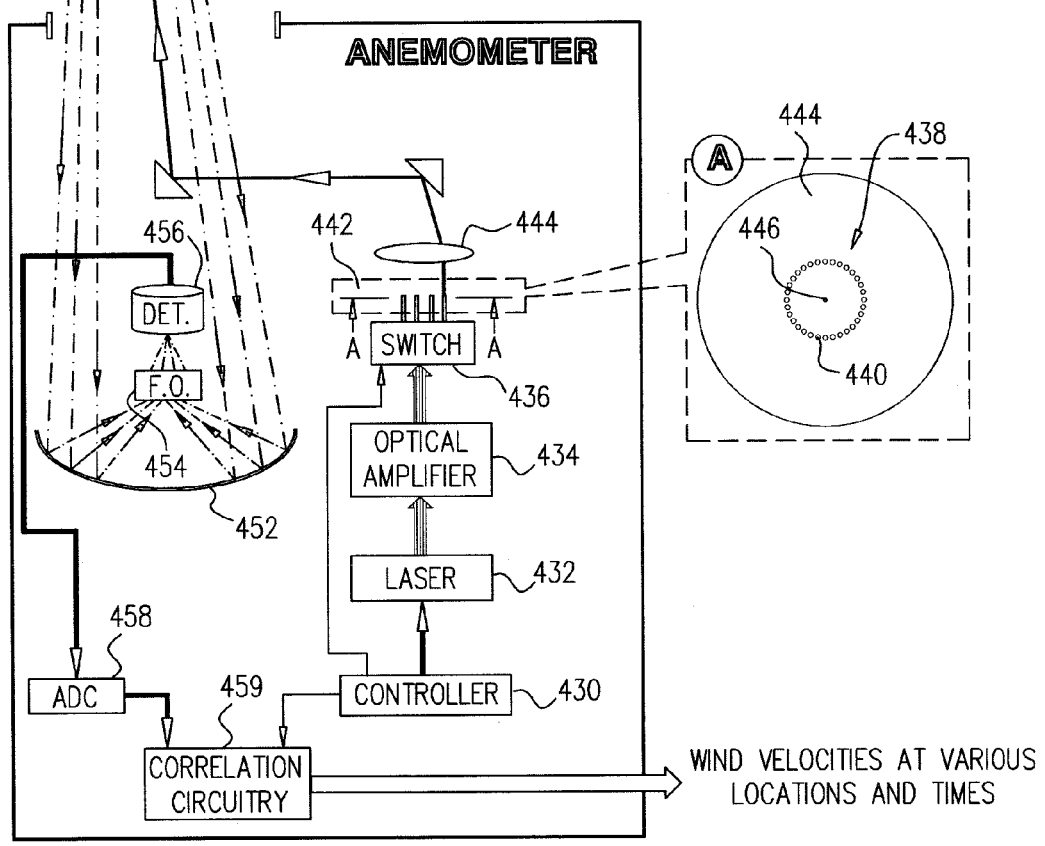
FIGS. 7A & 7B are simplified, partially pictorial, partially schematic illustrations of the structure and operation of another alternative embodiment of a non-coherent laser anemometer for monitoring wind characteristics including correlation circuitry operative for providing output indications of wind velocity.
Figure 7B:
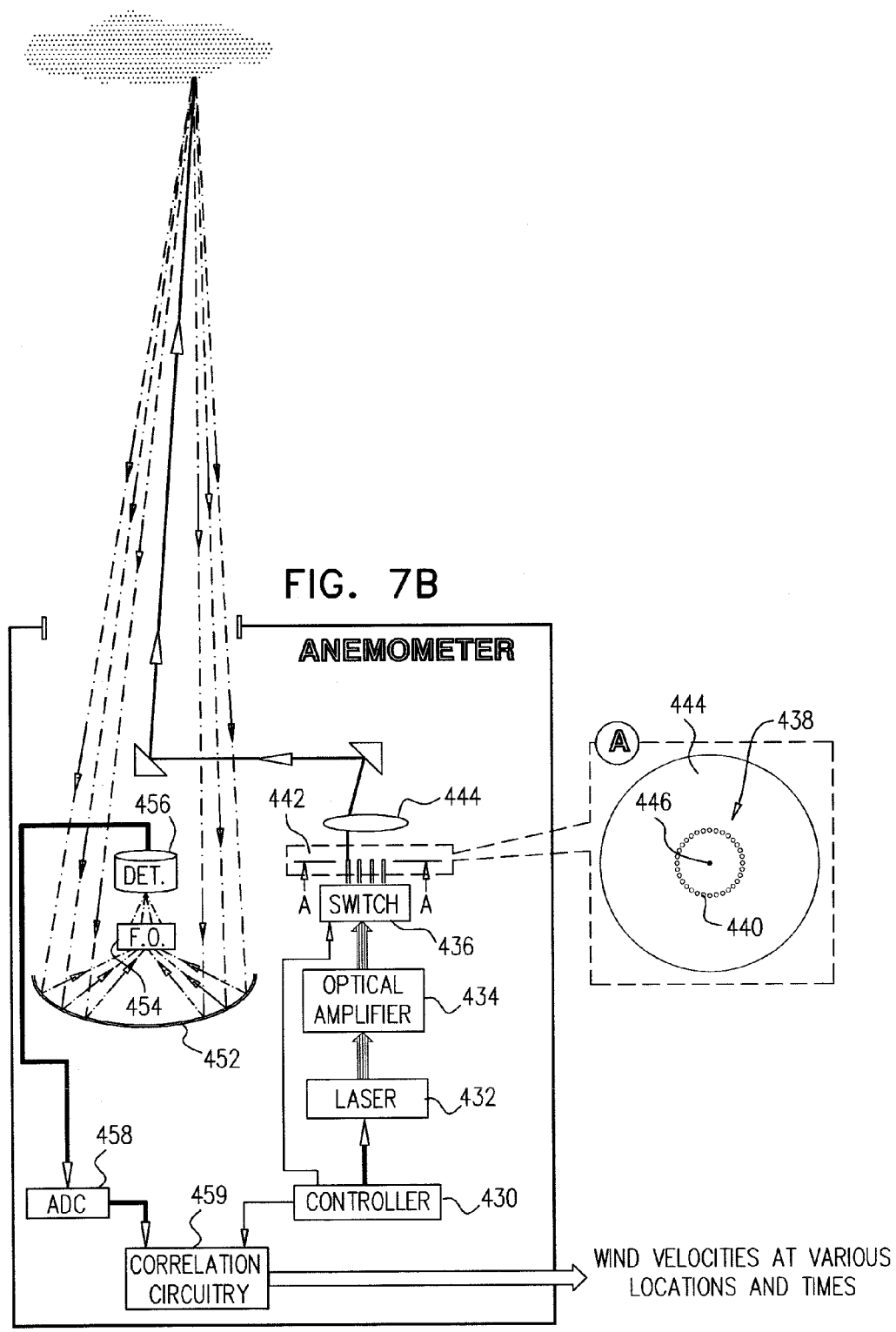
Figure 8A:
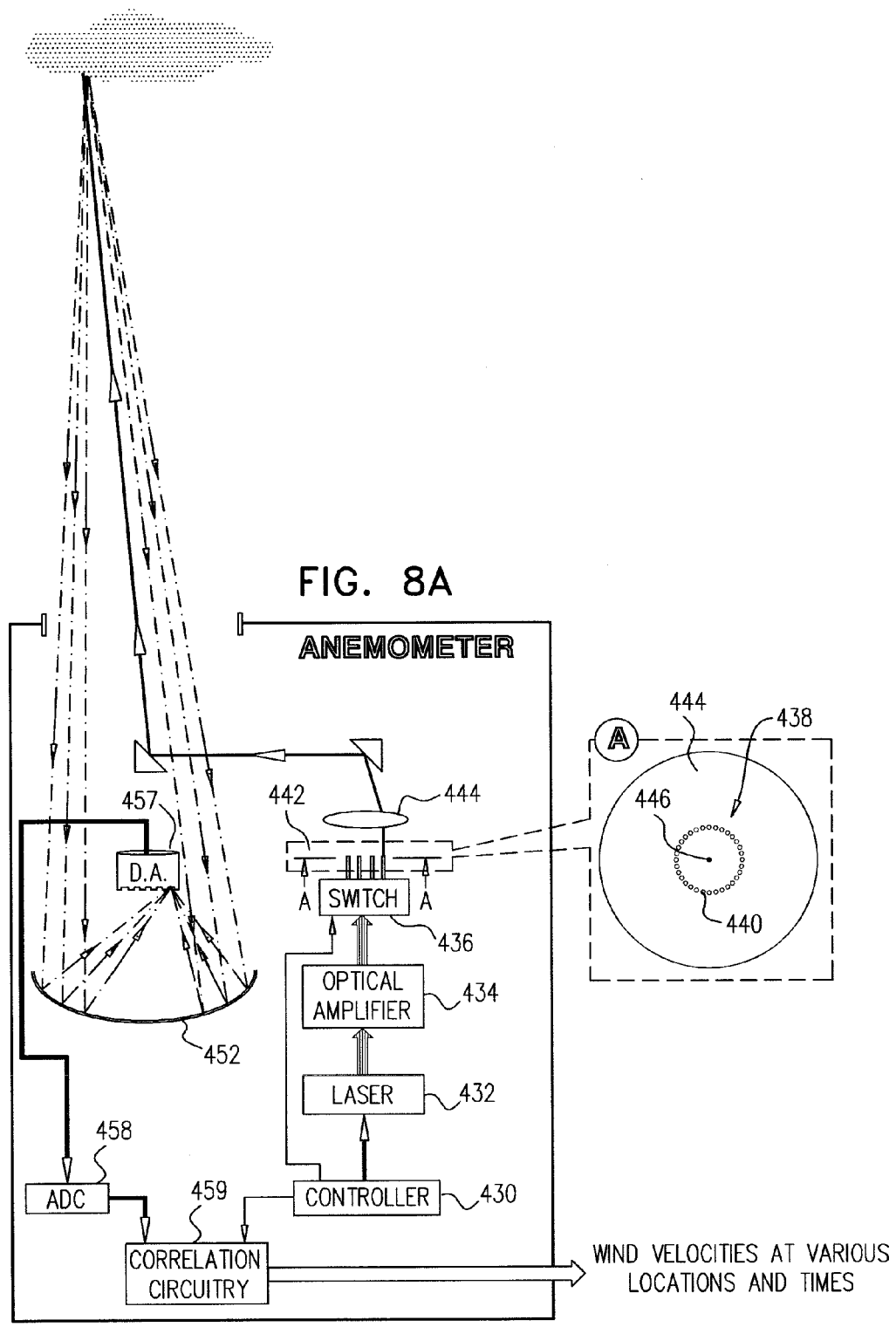
FIGS. 8A & 8B are simplified, partially pictorial, partially schematic illustrations of the structure and operation of yet another alternative embodiment of a non-coherent laser anemometer for monitoring wind characteristics including correlation circuitry operative for providing output indications of wind velocity.
Figure 8B:
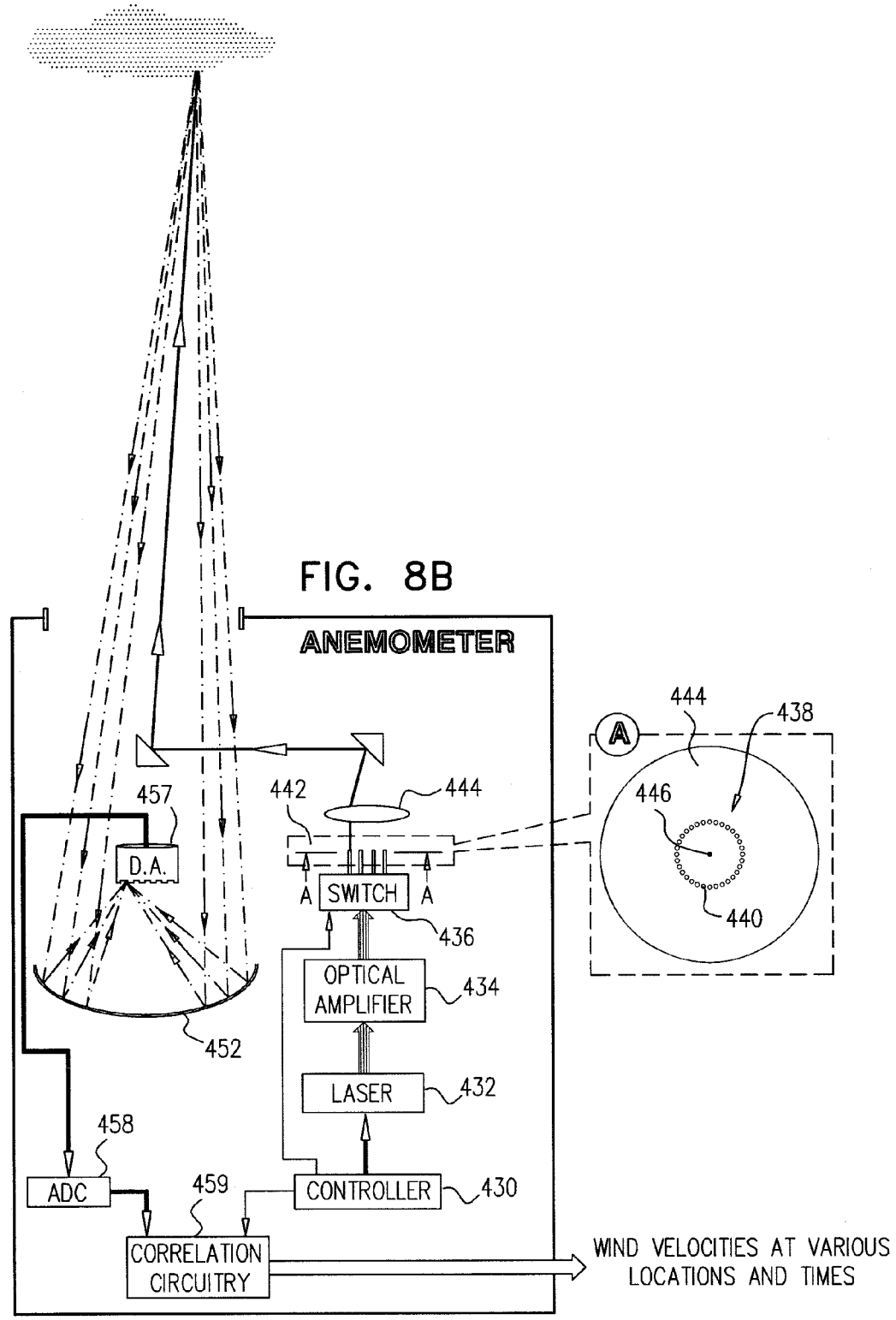

Reference is now made to FIGS. 7A & 7B, which are simplified, partially pictorial, partially schematic illustrations of the structure and operation of another alternative embodiment of a non-coherent laser anemometer for monitoring wind characteristics including correlation circuitry operative for providing output indications of wind velocity, and to FIGS. 8A & 8B, which are simplified, partially pictorial, partially schematic illustrations of the structure and operation of yet another alternative embodiment of a non-coherent laser anemometer for monitoring wind characteristics including correlation circuitry operative for providing output indications of wind velocity.

As seen in FIGS. 7A-8B, an anemometer transmission controller 430, including a master oscillator and time setting circuitry, provides timed control outputs to a laser 432, such as a KULT laser commercially available from Keopsys SA of Lannion, France. The control outputs preferably control the power level and the timing of pulse outputs of the laser 432. The pulse outputs of laser 432 are typically carried by an optical fiber to an optical amplifier 434, such as a High Power Variable Gain/Fixed Gain EDFA, commercially available from Red-C Optical Networks Ltd. of Israel. It is appreciated that any other suitable optical amplifier may be employed. It is also appreciated that the optical amplifier 434 may be obviated where laser 432 generates sufficient power.

An amplified laser output of optical amplifier 434 is preferably carried by an optical fiber to a switch 436, such as a Fast Fiber Optic 1×32 Switch, commercially available from Sercalo Microtechnology Ltd. of Schaan, Liechtenstein. Switch 436 is controlled by controller 430 such that the laser output of optical amplifier 434 is channeled to any one of the exit ports of switch 436 according to a command provided by controller 430.

The outputs of switch 436 are a plurality of pulsed beams, each of which is preferably carried by a separate optical fiber. Preferably, a bundle 438 of 32 separate optical fibers 440 is employed to carry a corresponding number of pulsed laser output beams as controlled by the control outputs provided by controller 430. Ends of the individual fibers 440 of bundle 438 lie in the focal plane 442 of a lens 444 in a desired, preferably circular, configuration arranged to provide an optical output of lens 444 having 32 non-mutually coherent pulsed beams arranged about a conical surface. Alternatively, a cascade of lenses may be provided instead of lens 444. Enlargement A, taken in the focal plane 442, as designated by section lines A-A, facing lens 444 and shows fibers 440 and the lens 444, the circular arrangement of the fibers being centered on the optical axis of lens 442, which is designated by reference numeral 446.

It is a further particular feature of this embodiment of the present invention that the multiple pulsed laser outputs are realized using a laser whose output is coupled to a fiber optic switch.

It is yet a further particular feature of the embodiments of FIGS. 7A-8B that the pulsed laser outputs may be distributed and channeled according to control outputs provided by controller 430, by apparatus, such as a switch, having no moving parts and thereby being suitable for use in rugged and relatively inaccessible environments. Alternatively, the pulsed laser outputs may be distributed and channeled by other mechanisms, such as by a rotating mirror or by MEMS technologies.

It is appreciated that any suitable desired arrangement of pulsed laser outputs may be realized in this way by suitable arrangement of the ends of the fibers 440 in the focal plane 442 of a suitable lens 444. It is also appreciated that the ends of the fibers 440 in the focal plane 442 of the lens 444 may be tilted in a way that enhances the capability of the lens 444 to collect light emitting from the plurality of fibers 440, thereby allowing lens 444 to be of a relatively simple and inexpensive design, which in turn allows for an anemometer design which is more robust and less expensive to manufacture, and thereby being better suited for mass market use.

The optical output of lens 444 typically impinges on one or more folding mirrors which direct the pulsed beams outwardly about a conical surface having a central axis (not shown). The pulsed beams typically impinge on particles, such as molecules of air or molecules or aerosols in the air, and are reflected thereby. Alternatively, the folding mirrors may be obviated and/or the lens may be replaced by one or more mirrors having optical power.

As shown in FIGS. 7A & 7B, reflection collection optics, preferably embodied in a mirror 452, receive reflections of the pulsed laser beams from aerosols in the air and directs them optionally via focusing optics 454, typically comprising at least one lens, preferably to a detector 456, typically an InGaAs APDs detector or an InGaAs PIN diode detector operating at 1100-1700 nanometers, both commercially available from Laser Components IG Inc. of Hudson, N.H., USA. Alternatively, as shown in FIGS. 8A & 8B, focusing optics 454 may be obviated and an array 457 of detectors may be employed instead of detector 456.

It is appreciated that the embodiments described in FIGS. 7A-8B may include an optical filter which filters out light of wavelengths outside the range of wavelengths generated by the anemometer before such light reaches detector 456 or array of detectors 457, thereby reducing the amount of background noise received by detector 456 or array of detector 457.

An amplified output from one or more detector 456 is supplied via an A/D converter 458, to correlation circuitry 459, which is operative to correlate signals derived from reflections from the variously directed pulsed beams in order to provide information as to direction and speed of movement of aerosols in the air, which information represents wind velocity. Correlation circuitry 459 is preferably embodied in software resident on a programmable processor chip, such as an FPGA. Additionally, other processing components such as a DSP or a CPU may be employed to perform at least part of the required correlation calculations in real time.

It is a particular feature of the present invention that correlation circuitry 459 is operative to correlate between reflections received from locations at same or different distances along a single pulsed beam and at locations at same or different distances at different pulsed beams and at different time intervals which represent a range of wind speeds which are to be measured. Preferably a result of the correlation performed in accordance with a preferred embodiment of the present invention is a vector at every location along the axis of the conical volume at which wind velocity is measured, which indicates wind velocity.

It is another particular feature of the present invention that the correlation is performed on pulsed laser beams which are not mutually coherent. This enables use of a laser and optics in the anemometer which are very substantially less expensive and which can operate at lower signal to noise ratios, than lasers and optics currently employed in conventional Doppler laser anemometers.

Figure 9:
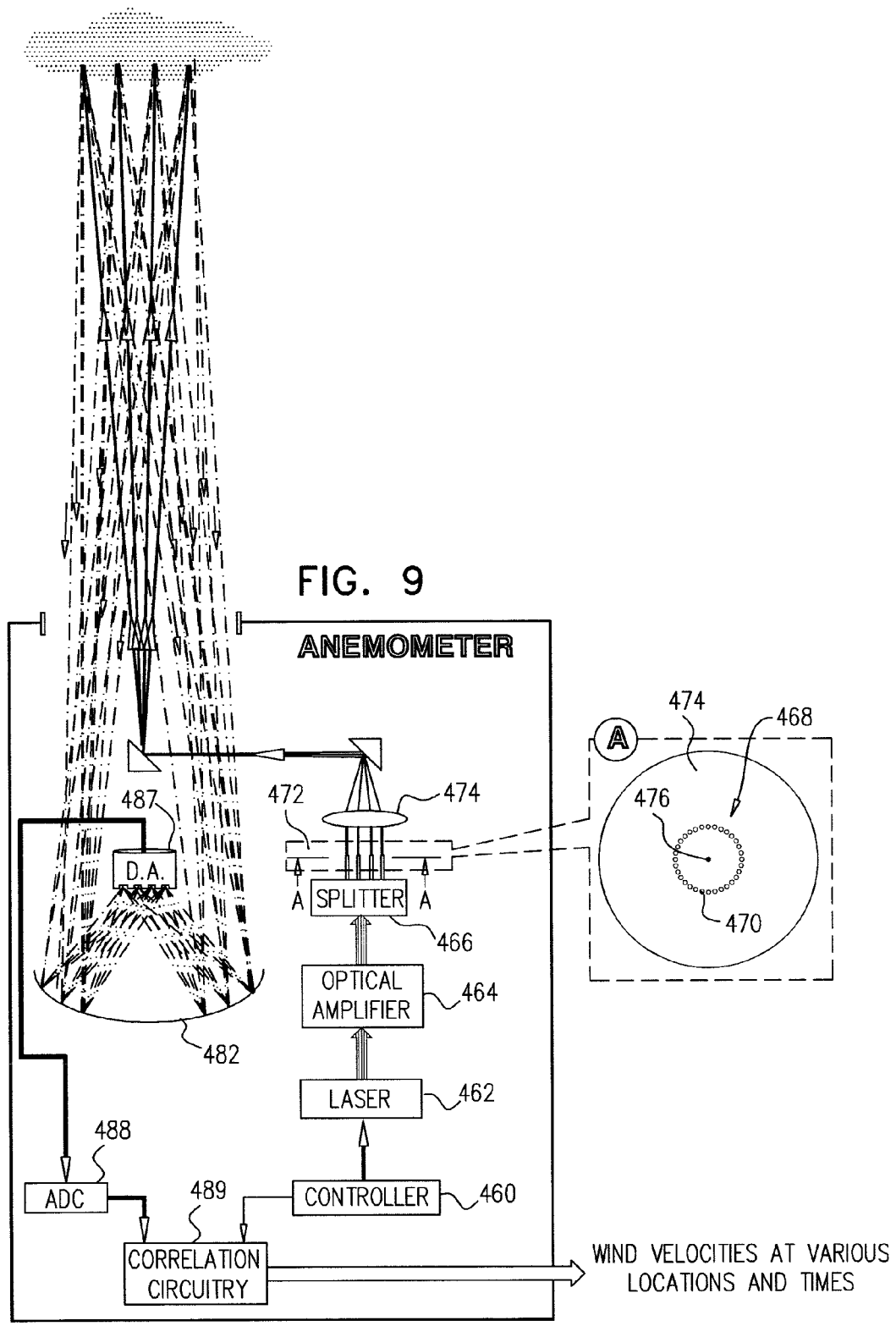
FIG. 9 is a simplified, partially pictorial, partially schematic illustration of the structure and operation of still another alternative embodiment of a non-coherent laser anemometer for monitoring wind characteristics including correlation circuitry operative for providing output indications of wind velocity.

Reference is now made to FIG. 9, which is a simplified, partially pictorial, partially schematic illustration of the structure and operation of still another alternative embodiment of a non-coherent laser anemometer for monitoring wind characteristics including correlation circuitry operative for providing output indications of wind velocity.

As seen in FIG. 9, an anemometer transmission controller 460, including a master oscillator and time setting circuitry, provides timed control outputs to a laser 462, such as a KULT commercially available from Keopsys SA of Lannion, France. The control outputs preferably control the power level and the timing of pulse outputs of the laser 462. The pulse outputs of laser 462 are typically carried by an optical fiber to an optical amplifier 464, such as a High Power Variable Gain/Fixed Gain EDFA, commercially available from Red-C Optical Networks Ltd. of Israel. It is appreciated that any other suitable optical amplifier may be employed.

An amplified laser output of optical amplifier 464 is preferably carried by an optical fiber to a splitter 466, such as a PLC based splitter.

The outputs of splitter 466 are a plurality of simultaneous pulsed beams, each of which is preferably simultaneously carried by a separate optical fiber. Preferably, a bundle 468 of 32 separate optical fibers 470 is employed to carry a corresponding number of pulsed laser output beams having identical wavelengths. Ends of the individual fibers 470 of bundle 468 lie in the focal plane 472 of a lens 474 in a desired, preferably circular, configuration arranged to provide an optical output of lens 474 having 32 non-mutually coherent pulsed beams arranged about a conical surface. Alternatively, a cascade of lenses may be provided instead of lens 474. Enlargement A, taken in the focal plane 472, as designated by section lines A-A, facing lens 474 and shows fibers 470 and the lens 474, the circular arrangement of the fibers being centered on the optical axis of lens 474, which is designated by reference numeral 476.

It is a further particular feature of this embodiment of the present invention that the multiple pulsed laser outputs are realized using a laser whose output is coupled to a splitter.

It is also a particular feature of the embodiment of FIG. 9 that the pulsed laser outputs are generated by apparatus, such as a splitter, having no moving parts and thereby being suitable for use in rugged and relatively inaccessible environments.

It is appreciated that any suitable desired arrangement of pulsed laser outputs may be realized in this way by suitable arrangement of the ends of the fibers 470 in the focal plane 472 of lens 474. It is also appreciated that the ends of the fibers 470 in the focal plane 472 of the lens 474 may be tilted in a way that enhances the capability of the lens 474 to collect light emitting from the plurality of fibers 470, thereby allowing lens 474 to be of a relatively simple and cheap design, which in turn allows for an anemometer design which is more robust and cheaper, and thereby being better suited for mass market use.

The optical output of lens 474 typically impinges on one or more folding mirrors which direct the pulsed beams outwardly about a conical surface having a central axis (not shown). The pulsed beams typically impinge on particles, such as molecules of air or molecules or aerosols in the air, and are reflected thereby. Alternatively, the folding mirrors may be obviated and/or the lens may be replaced by one or more mirrors having optical power.

As shown in FIG. 9, reflection collection optics, preferably embodied in a mirror 482, receive reflections of the pulsed laser beams from aerosols in the air and directs them preferably to an array 487 of detectors, preferably one detector for each of the pulsed laser beams, typically an InGaAs APDs detector or a PIN diode detector operating at 1100-1700 nanometers, both commercially available from Laser Components IG Inc. of Hudson, N.H., USA.

It is appreciated that the embodiments described in FIG. 9 may include an optical filter which filters out light of wavelengths outside the range of wavelengths generated by the anemometer before such light reaches array of detectors 487, thereby reducing the amount of noise received by array of detectors 487.

An amplified output from array 487 of detectors is supplied via an array 488 of 32 ADC converters corresponding to the 32 pulsed beams, to correlation circuitry 489, which is operative to correlate signals derived from reflections from the variously directed pulsed beams in order to provide information as to direction and speed of movement of aerosols in the air, which information represents wind velocity. Correlation circuitry 489 is preferably embodied in software resident on a programmable processor chip, such as an FPGA. Additionally, other processing components such as a DSP or a CPU may be employed to perform at least part of the required correlation calculations in real time.

It is a particular feature of the present invention that correlation circuitry 489 is operative to correlate between reflections received from locations at same or different distances along a single pulsed beam and at locations at same or different distances at different pulsed beams and at different time intervals which represent a range of wind speeds which are to be measured. Preferably a result of the correlation performed in accordance with a preferred embodiment of the present invention is a vector at every location along the axis of the conical volume at which wind velocity is measured, which indicates wind velocity.

It is another particular feature of the present invention that the correlation is performed on pulsed laser beams which are not mutually coherent. This enables use of a laser and optics in the anemometer which are very substantially less expensive and which can operate at lower signal to noise ratios, than lasers and optics currently employed in conventional Doppler laser anemometers.

Figure 10:
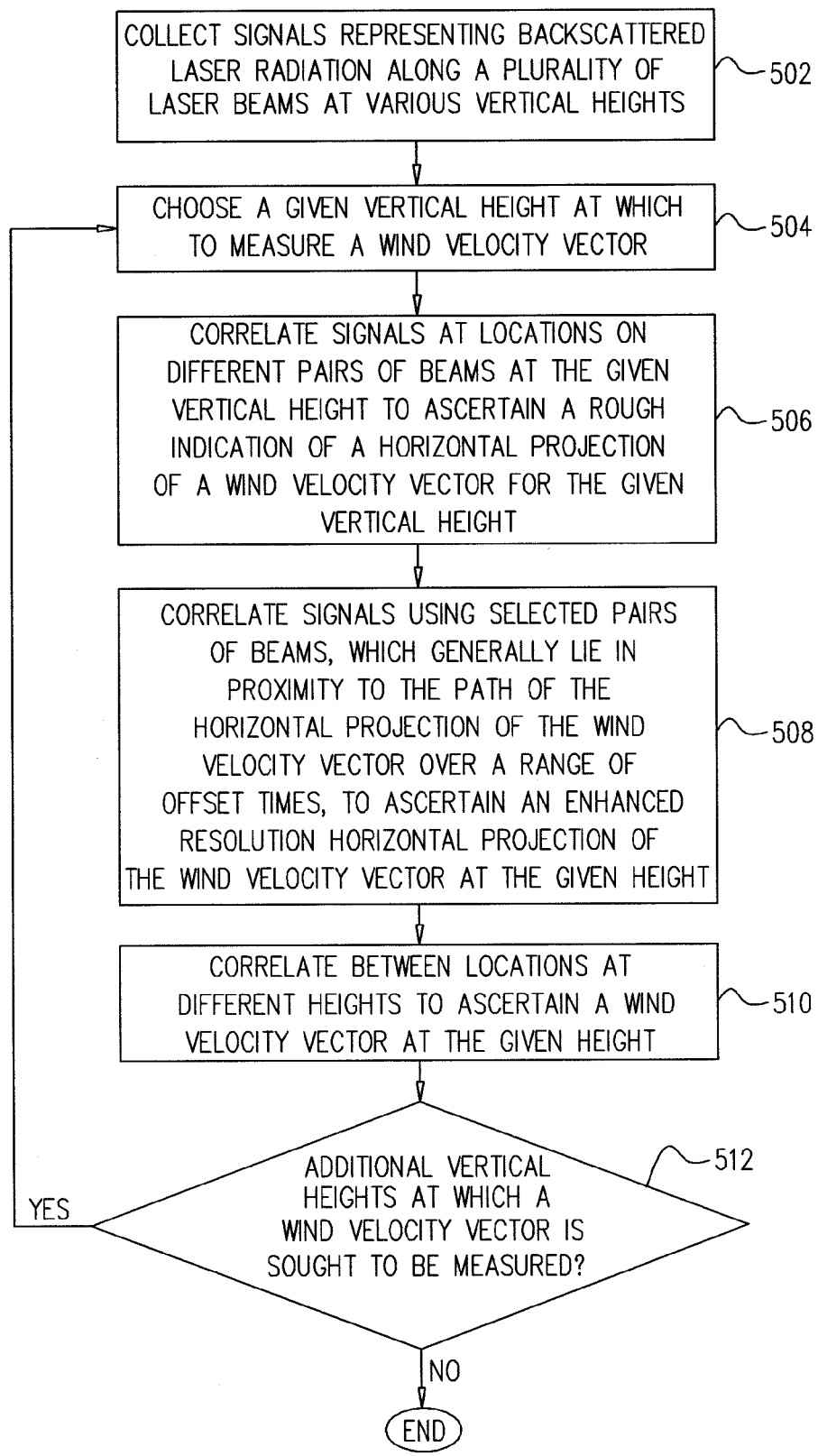
FIG. 10 is a simplified flowchart illustrating operation of the correlation circuitry of the system of FIGS. 5A-9 for pulsed laser beams directed generally vertically.
Figure 11:
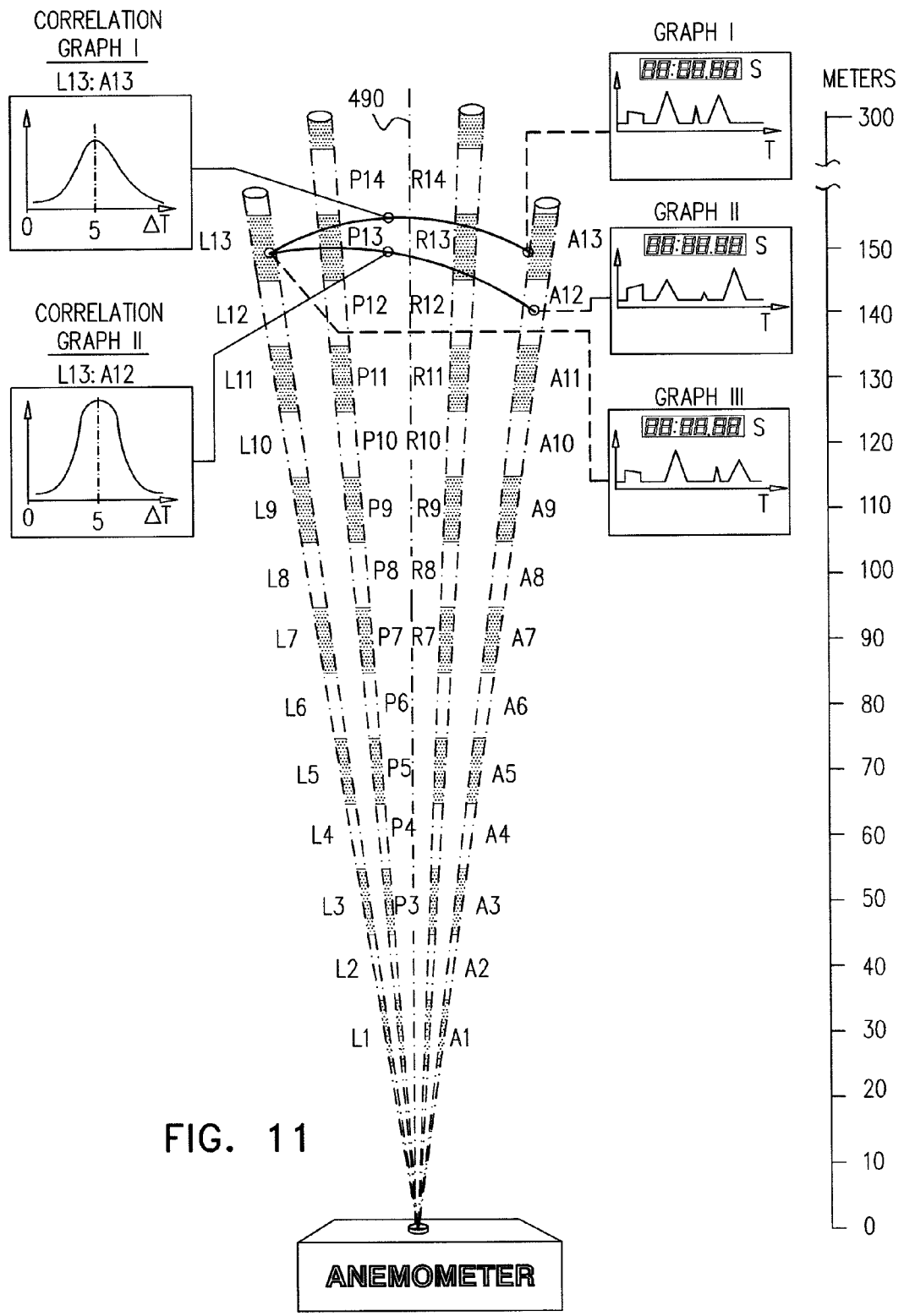
FIG. 11 is a simplified pulsed laser beam correlation diagram useful in understanding the operation of the functionality of FIG. 10.

Reference is now made to FIG. 10, which is a simplified flowchart illustrating operation of the correlation circuitry of the system of FIGS. 5A-9, and to FIG. 11, which is a simplified pulsed laser beam correlation diagram useful in understanding the operation of the system of FIGS. 5A-9 for pulsed laser beams directed generally vertically.

As described hereinabove with reference to FIGS. 5A-9, a plurality of pulsed laser beams, preferably 32 in number, are directed along a conical surface centered on an axis 490. Axis 490 may be directed in any suitable direction. Normally when a laser anemometer is located on a ground surface, axis 490 is directed vertically. When a laser anemometer is located on a nacelle of a wind turbine, axis 490 is typically in a horizontal plane.

In the illustrated example, described hereinbelow, axis 490 is vertical. FIG. 11 shows four typical pulsed laser beams, here designated by letters, A, L, P and R, which are arranged along a conical surface about axis 490.

As indicated in the simplified flowchart of FIG. 10 at block 502, initially signals representing laser radiation from the plurality of laser beams backscattered by aerosols in the air at various distances from the laser anemometer, representing various vertical heights, are collected over a predetermined measurement time.

Thereafter, as shown at block 504, a given vertical height at which to measure a wind velocity vector is chosen.

Thereafter, as shown at block 506, initial correlations of received signals at locations on different pairs of beams, which are at the same distance from the anemometer, are performed. Where axis 490 is vertical, these correlations are generally between locations which are generally in the same horizontal plane. This is based on an assumption that wind is generally horizontal. Such correlations are preferably initially performed between some but not all pairs of pulsed laser beams, typically beams A, L, P and R shown in FIG. 11. Graph I depicts the signal received from location A13, Graph II depicts the signal received from location A12 and Graph III depicts the signal received from location L13.

A typical correlation graph is designated as correlation graph I and shows the correlation between signals received from location L13 and signals received from location A13, locations L13 and A13 typically being spaced 25 meters apart. A maximum correlation between the signals received from the two locations is expected at the time that it takes for the wind to flow from L13 to A13. Correlation graph I shows that the maximum correlation between the signals received from the two locations is received at a time shift of 5 seconds, which means that the average horizontal speed of the wind between locations L13 and A13 is 5 meters per second.

Based on the results of various correlations between different pairs of pulsed laser beams, typically A, L, P and R at the same height, a rough indication of the direction and amplitude of a horizontal projection of a wind velocity vector is ascertained for such height.

Thereafter, as shown at block 508, further correlations are conducted, using selected beams which generally lie in proximity to the path of the horizontal projection of the wind velocity vector, over a range of offset times which lies about the offset time represented by the correlation peak, such as that in correlation graph I. These further correlations provide an enhanced resolution correlation result both in terms of direction and in terms of offset time, thereby providing an enhanced resolution horizontal projection of the wind velocity vector at the given height.

Thereafter, as shown at block 510, additional correlations are performed between locations at different distances from the laser anemometer, i.e. at different heights. A typical such correlation is shown in FIG. 11 between locations L13 and A12.

A typical correlation graph for such an additional correlation is designated as correlation graph II, and shows the correlation between signals received from location L13 and signals received from location A12, locations L13 and A12 typically being spaced 27 meters apart. A maximum correlation between the signals received from the locations is expected at the time that it takes for the wind to flow from L13 to A12. As seen in correlation graph II, this maximum correlation is higher than the maximum correlation shown in graph I, indicating that the true vector of the wind is not exactly horizontal but rather in the direction from L13 to A12. Correlation graph II also shows that the peak in correlation is received at a time shift in time shift of 5 seconds, which means that the average speed of the wind between locations L13 and A12 is 5.4 m/sec.

Based on the results of various correlations between different pairs of pulsed laser beams, typically A, L, P and R at the different heights in the vicinity of the height at which the horizontal correlations were performed, an indication of a wind velocity vector is ascertained for such height.

As shown at block 512, the above procedure is repeated for all relevant heights at which a wind velocity vector is sought to be measured and is preferably repeated over time. The wind velocity vectors are stored and employed as appropriate.

Figure 12:
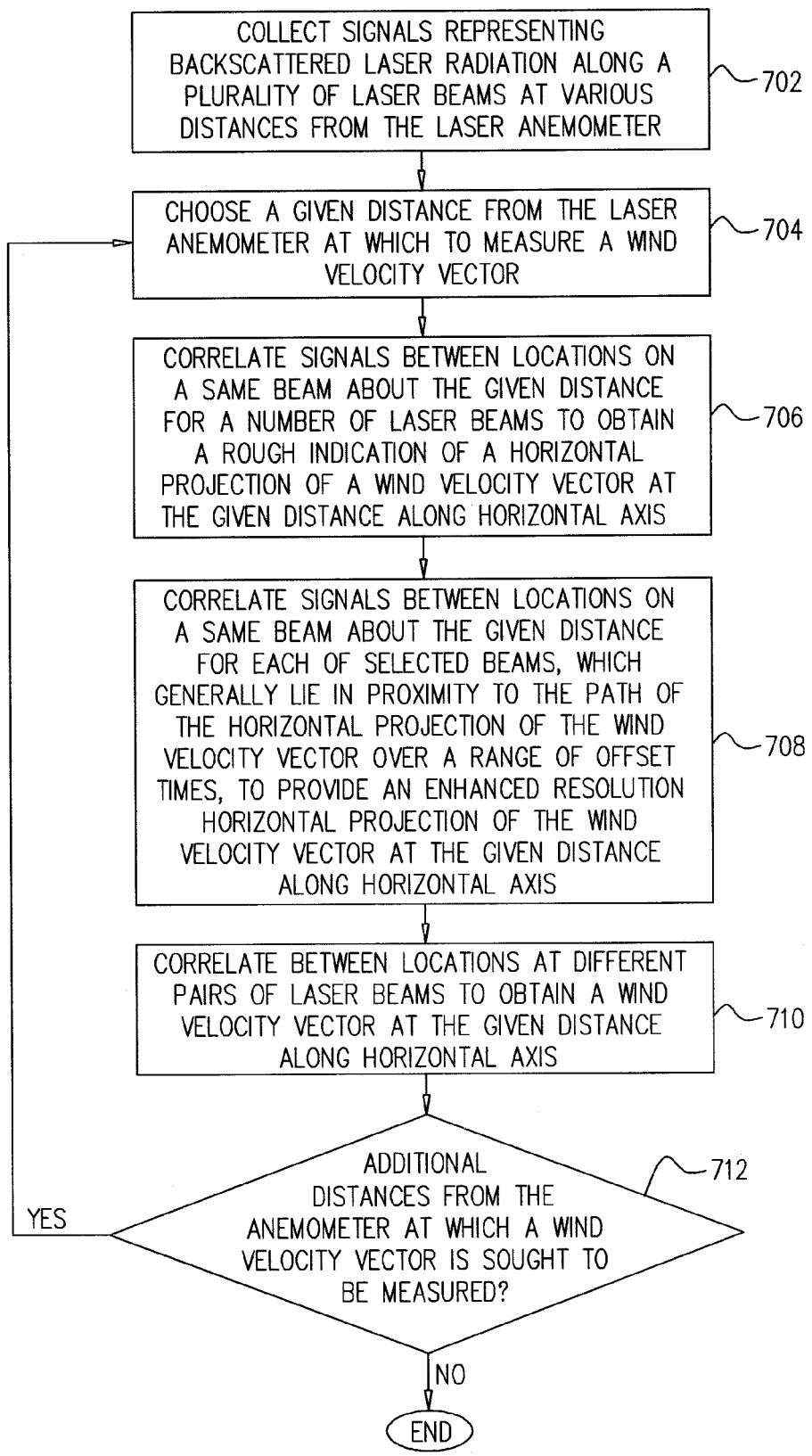
FIG. 12 is a simplified flowchart illustrating operation of the correlation circuitry of the system of FIGS. 5A-9 for pulsed laser beams directed generally horizontally.
Figure 13:
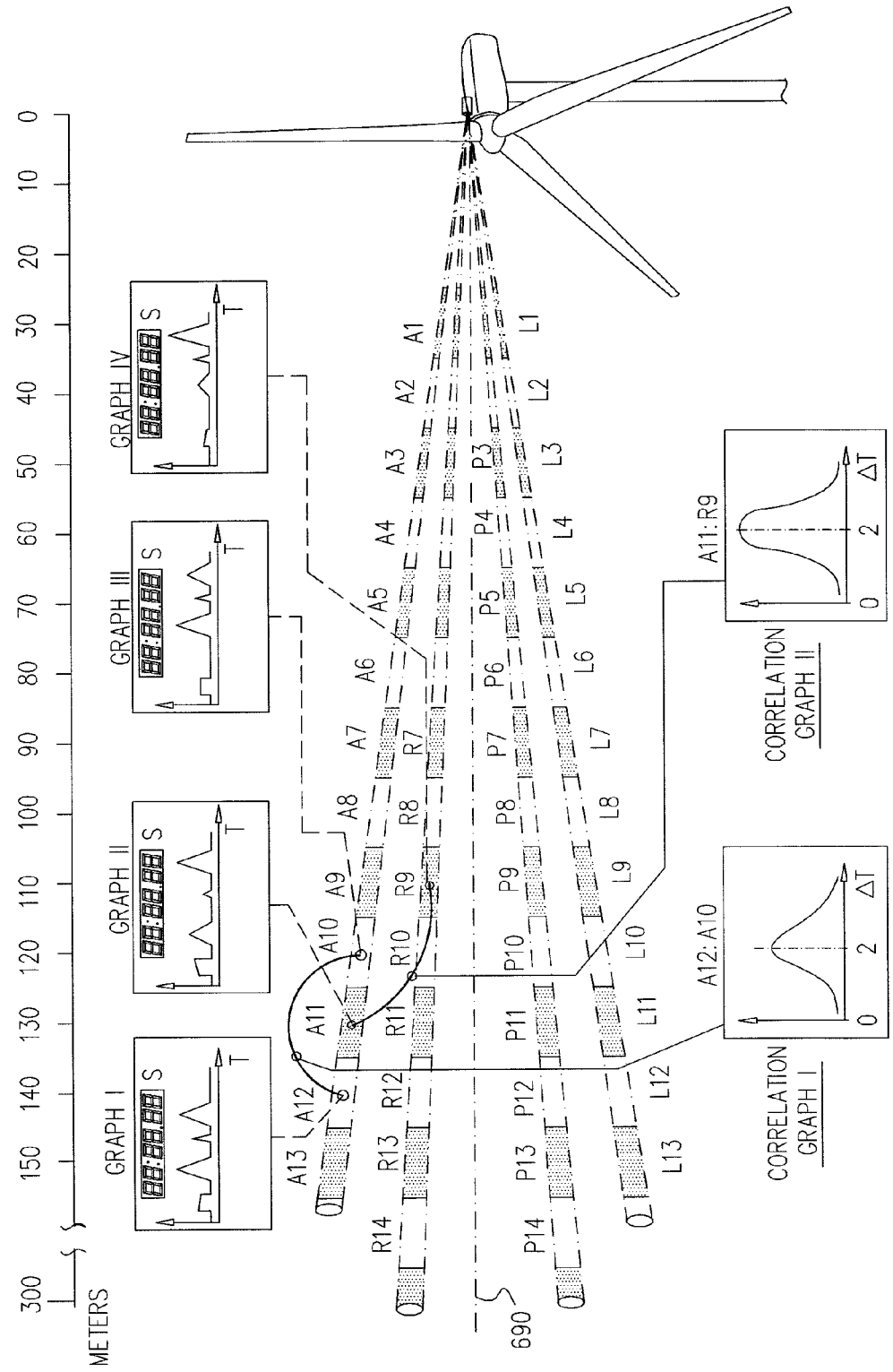
FIG. 13 is a simplified pulsed laser beam correlation diagram useful in understanding the operation of the functionality of FIG. 12.

Reference is now made to FIG. 12, which is a simplified flowchart illustrating operation of the correlation circuitry of the system of FIGS. 5A-9, and to FIG. 13, which is a simplified pulsed laser beam correlation diagram useful in understanding the operation of the system of FIGS. 5A-9 for pulsed laser beams directed generally horizontally.

As described hereinabove with reference to FIGS. 5A-9, a plurality of pulsed laser beams, preferably 32 in number, are directed along a conical surface centered on an axis 690. Axis 690 may be directed in any suitable direction. Normally when a laser anemometer is located on a ground surface, axis 690 is directed vertically. When a laser anemometer is located on a nacelle of a wind turbine, axis 690 typically lies in a horizontal plane.

In the illustrated example, described hereinbelow, axis 690 is horizontal. FIG. 13 shows four typical pulsed laser beams, here designated by letters, A, L, P and R, which are arranged along a conical surface about axis 690.

As indicated in the simplified flowchart of FIG. 12 at block 702, initially signals representing laser radiation from the plurality of laser beams backscattered by aerosols in the air at various distances from the laser anemometer, representing various generally horizontal distances from the laser anemometer, are collected over a predetermined measurement time.

Thereafter, as shown at block 704, a given distance from the laser anemometer at which to measure a wind velocity vector is chosen.

Thereafter, as shown at block 706, initial correlations of signals received from different locations at approximately the given distance along a particular beam are performed, preferably for some but not all of pulsed laser beams, typically beams A, L, P, and R shown in FIG. 13. This is based on an assumption that wind is generally horizontal. Graph I depicts the signal received from location A12, Graph II depicts the signal received from location A11, Graph III depicts the signal received from location A10 and Graph IV depicts the signal received from location R9.

A typical correlation graph is designated as correlation graph I and shows the correlation between the signals received from location A10 and signals received from location A12, locations A10 and A12 typically being spaced 20 meters apart. A maximum correlation between the signals received from the two locations is expected at the time that it takes for the wind to flow from A10 to A12. Correlation graph I shows that the maximum correlation between the signals received from the two locations is received at a time shift of 2 seconds, which means that the average speed of the wind between locations A10 and A12 is 10 meters per second.

Based on the results of various correlations between locations at approximately the given distance along a particular beam of some pulsed laser beams, typically A, L, P and R, a rough indication of the direction and amplitude of a horizontal projection of a wind velocity vector is ascertained for the given distance along beam A.

Thereafter, as shown at block 708, further correlations are conducted, using selected beams which generally lie in proximity to the path of the horizontal projection of the wind velocity vector, over a range of offset times which lies about the offset time represented by the correlation peak, such as that in correlation graph I. These further correlations provide an enhanced resolution correlation result both in terms of direction and in terms of offset time, thereby providing an enhanced resolution horizontal projection of the wind velocity vector at the given distance.

Thereafter, as shown at block 710, additional correlations are performed between locations on different beams.

A typical correlation graph for such an additional correlation is designated in FIG. 13 as correlation graph II, and shows the correlation between signals received from location R9 and signals received from location A11, locations R9 and A11 typically being spaced 25 meters apart. A maximum correlation between the signals received from the locations is expected at the time that it takes for the wind to flow from R9 and A11. As seen in correlation graph II, this maximum correlation is higher than the maximum correlation shown in graph I, indicating that the true velocity of the wind is not along the beam A but rather in the direction from R9 to A11. Correlation graph II also shows that the peak in correlation is received at a time shift of 2 seconds, which means that the average speed of the wind between locations R9 and A11 is 12.5 meters per second.

Based on the results of various correlations between different pairs of pulsed laser beams, typically A, L, P, and R, an indication of a wind velocity vector is obtained at the given distance along horizontal axis 690.

As shown at block 712, the above procedure is repeated for all relevant distances from the laser anemometer at which a wind velocity vector is sought to be measured and is preferably repeated over time. The wind velocity vectors are stored and employed as appropriate.

Figure 14:
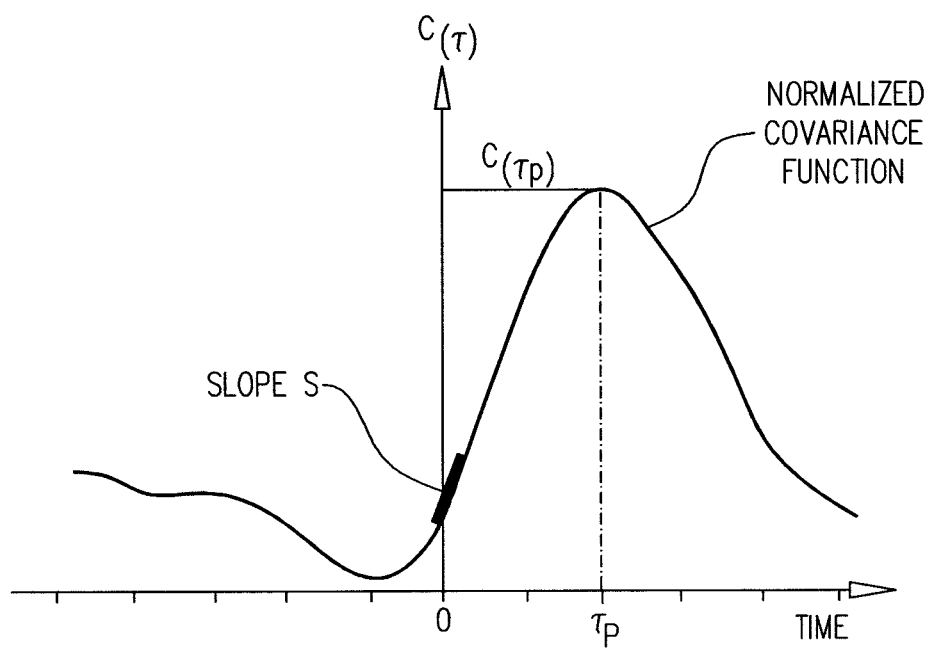
FIG. 14 is a typical correlation graph produced by the correlation circuitry of the non-coherent laser anemometer of FIGS. 5A-9.

Reference is now made to FIG. 14, which is a typical correlation graph produced by the correlation circuitry of the non-coherent laser anemometer of FIGS. 5A-9.

A correlation function $C(\tau)$ can be mathematically described as follows:

$$C(\tau) = \frac{\sum_{i=0}^{n} [I_A(t_i+\tau) - \bar{I}_A][I_B(t_i) - \bar{I}_B]}{\sqrt{\sum_{i=0}^{n}[I_A(t_i) - \bar{I}_A]^2 \sum_{i=0}^{n}[I_B(t_i) - \bar{I}_B]^2}}$$

where:

$I_A$ and $I_B$ are the intensities of reflected laser beams from locations A and B in space, respectively, as a function of time;

$t_i$ marks one of n points in time at which samples of reflections are recorded; $\bar{I}_A$ and $\bar{I}_B$ are the average intensities of the reflections from locations A and B respectively over n samples recorded at the n points in time; and $\tau$ is a time difference parameter for which the correlation function is being calculated $\tau$ may be either positive or negative.

As seen in FIG. 14, the correlation function C reaches a peak at a time difference of $\tau_p$ which represents the time it takes for specific reflecting pattern to move from location A to B in space, thereby creating a peak correlation between the intensities of the reflected laser beams as measured at location A and location B within this time difference. Assuming that the reflection pattern drift in space is almost unchanged with the local wind vector (at least for a short period of time, which is of the same order of magnitude as $\tau_p$), the correlation peak actually measures the time it takes for the wind to carry the reflecting particles from location A to location B, and therefore the time of peak correlation is directly proportional to the average wind speed between location A and B in space. As described hereinabove with regard to FIGS. 11 & 13, building multiple correlation functions between multiple locations in space and then analyzing the resulting peaks of the different correlation functions facilitates generally accurate calculation of both wind speed and wind direction in space.

As is known to persons skilled in the prior art, and as shown by Ting-i Wang et al incorporated by reference herein, additional methods are available to calculate a wind vector from a correlation function. Such methods include measuring the slope of the correlation function around at about a time difference of $\tau_p=0$, measuring the width of an autocorrelation function which is a correlation of location A with location A, and/or measuring the crossing point of the autocorrelation function and the correlation function. All of these parameters provide for generally accurate calculations of the wind speed that is being measured by the laser anemometer between at least two locations in space.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A laser anemometer comprising:
   a tunable laser;
   a scanner, receiving an output from said tunable laser and providing laser beam outputs in various scanning directions;
   at least one detector for receiving signals from back scattered laser beam outputs; and
   correlation circuitry operative to correlate signals received by said at least one detector and to provide information as to direction and speed of movement of aerosols in the air, said information representing wind velocity.

2. A laser anemometer according to claim 1 and also comprising an anemometer transmission controller operative to provide timed control outputs to said tunable laser.

3. A laser anemometer according to claim 1 and wherein said control outputs comprise a power level, timing and a wavelength of pulse outputs of said tunable laser.

4. A laser anemometer according to claim 1 and also comprising an optical amplifier.

5. A laser anemometer according to claim 1 and also comprising a wavelength division multiplexer coupled to said tunable laser.

6. A laser anemometer according to claim 1 and wherein said at least one detector comprises an array of detectors.

7. A laser anemometer according to claim 1 and also comprising an optical filter.

8. A laser anemometer comprising:
   a wavelength tunable laser;
   a wavelength responsive scanner, receiving an output from said wavelength tunable laser at multiple wavelengths and providing laser beam outputs in various scanning directions in accordance with said multiple wavelengths; and
   at least one detector for receiving signals from back scattered laser beam outputs.

9. A laser anemometer comprising:

a laser;

an optical switch responsive to a control signal for providing laser beams in various scanning directions which are non-coherent when they impinge on particles in the atmosphere; and at least one detector for receiving signals from back scattered laser beam outputs which are not coherent.

10. A laser anemometer according to claim 9 and also comprising an optical amplifier.

11. A laser anemometer according to claim 9 and wherein said at least one detector comprises an array of detectors.

12. A laser anemometer according to claim 9 and also comprising an optical filter.

13. A laser anemometer according to claim 9 and also comprising correlation circuitry operative to correlate signals received by said at least one detector.

14. A laser anemometer comprising:

a laser;

an optical switch having no moving parts and being responsive to a control signal for providing laser beam outputs in various scanning directions; and at least one detector for receiving signals from back scattered laser beam outputs.

15. A laser anemometer according to claim 14 and also comprising an optical amplifier.

16. A laser anemometer according to claim 14 and wherein said at least one detector comprises an array of detectors.

17. A laser anemometer according to claim 14 and also comprising an optical filter.

18. A laser anemometer according to claim 14 and also comprising correlation circuitry operative to correlate signals received by said at least one detector.

19. A laser anemometer comprising:

a laser;

a MEMS optical switch being responsive to a control signal for providing laser beam outputs in various scanning directions; and at least one detector for receiving signals from back scattered laser beam outputs.

20. A laser anemometer according to claim 19 and also comprising an optical amplifier.

21. A laser anemometer according to claim 19 and wherein said at least one detector comprises an array of detectors.

22. A laser anemometer according to claim 19 and also comprising an optical filter.

23. A laser anemometer according to claim 19 and also comprising correlation circuitry operative to correlate signals received by said at least one detector.

24. A laser anemometer comprising:

a laser;

a laser beam splitter for providing laser beam outputs simultaneously in a plurality of scanning directions;

a plurality of detectors for receiving signals from back scattering of said laser beam outputs; and correlation circuitry operative to correlate signals received by said plurality of detectors and to provide information as to direction and speed of movement of aerosols in the air, said information representing wind velocity.

25. A laser anemometer according to claim 24 and also comprising an optical amplifier.

26. A laser anemometer according to claim 24 and also comprising an optical filter.

* * * * *